(12) United States Patent
Taylor et al.

(10) Patent No.: US 10,780,350 B2
(45) Date of Patent: *Sep. 22, 2020

(54) SPATIALLY AND USER AWARE SECOND SCREEN PROJECTION FROM A COMPANION ROBOT OR DEVICE

(71) Applicant: Sony Interactive Entertainment Inc., Tokyo (JP)

(72) Inventors: Michael Taylor, San Mateo, CA (US); Jeffrey Roger Stafford, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/224,775

(22) Filed: Dec. 18, 2018

(65) Prior Publication Data

US 2019/0118091 A1 Apr. 25, 2019

Related U.S. Application Data

(63) Continuation of application No. 15/700,005, filed on Sep. 8, 2017, now Pat. No. 10,155,166.

(51) Int. Cl.
*A63F 13/655* (2014.01)
*A63F 13/25* (2014.01)
(Continued)

(52) U.S. Cl.
CPC .......... *A63F 13/655* (2014.09); *A63F 13/213* (2014.09); *A63F 13/25* (2014.09);
(Continued)

(58) Field of Classification Search
None
See application file for complete search history.

(56) References Cited

U.S. PATENT DOCUMENTS 9,711,114 B1 * 7/2017 Konttori ................. G06F 3/013
2012/0035934 A1 * 2/2012 Cunningham ........ G06F 1/1639
704/260

(Continued)

OTHER PUBLICATIONS

Honda Motor Co., Ltd: "ASIMO—Technical Information", Sep. 30, 2007 (Sep. 30, 2007), pp. 1-18, XP002786786, Retrieved from the Internet: URL:http://asimo.honda.com/downloads/pdf/asimo-technical-information.pdf [retrieved on Nov. 23, 2018] p. 22.

(Continued)

*Primary Examiner* — Seng H Lim
(74) *Attorney, Agent, or Firm* — Penilla IP, APC

(57) ABSTRACT

A robot, including: a controller that communicates with a computing device, wherein the computing device executes a video game and renders a primary video feed of the video game to a display device, the primary video feed providing a first view into a virtual space that is defined by the executing video game; a camera that captures images of a local environment in which the robot is disposed; a projector; wherein the controller processes the images of the local environment to identify a projection surface in the local environment; wherein the computing device generates a secondary video feed of the video game and transmits the secondary video feed of the video game to the robot, the secondary video feed providing a second view into the virtual space; wherein the controller of the robot activates the projector to project the secondary video feed onto the projection surface in the local environment.

19 Claims, 15 Drawing Sheets

(51) Int. Cl.
*G06F 3/01* (2006.01)
*A63F 13/428* (2014.01)
*A63F 13/26* (2014.01)
*A63F 13/65* (2014.01)
*A63F 13/213* (2014.01)
*A63F 13/98* (2014.01)

(52) U.S. Cl.
CPC ............ *A63F 13/26* (2014.09); *A63F 13/428* (2014.09); *A63F 13/65* (2014.09); *A63F 13/98* (2014.09); *G06F 3/013* (2013.01); *G09G 2354/00* (2013.01)

(56) References Cited

U.S. PATENT DOCUMENTS

| | | | |
|---|---|---|---|
| 2012/0190448 A1 | 7/2012 | Larsen et al. | |
| 2012/0272179 A1* | 10/2012 | Stafford | G06F 3/012 715/781 |
| 2012/0295708 A1 | 11/2012 | Hernandez-Abrego et al. | |
| 2013/0050206 A1* | 2/2013 | Willis | G06F 1/1637 345/419 |
| 2014/0328505 A1* | 11/2014 | Heinemann | H04S 7/303 381/303 |
| 2014/0380230 A1* | 12/2014 | Venable | G06F 3/013 715/781 |
| 2015/0281640 A1* | 10/2015 | Kwon | G06F 3/01 348/14.07 |
| 2016/0378179 A1* | 12/2016 | Baca | G06F 3/038 345/156 |
| 2017/0244942 A1 | 8/2017 | Ma | |
| 2018/0004286 A1* | 1/2018 | Chen | G06F 3/013 |

OTHER PUBLICATIONS

PCT International Search Report and Written Opinion of the International Searching Authority issued in corresponding International Patent Application No. PCT/US2018/050107 dated Dec. 3, 2018 (PCT Forms ISA 220, 210, 237) (13 total pages).

* cited by examiner

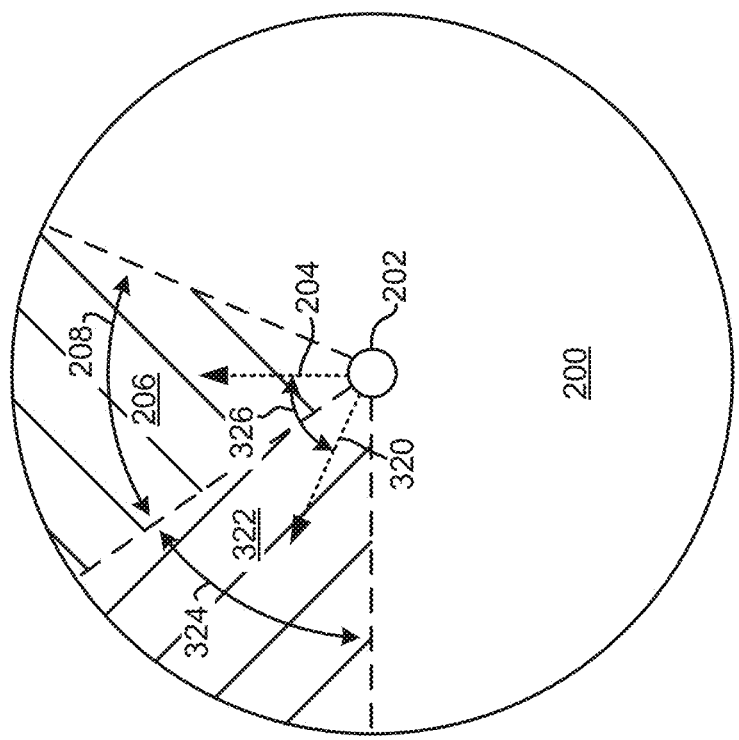
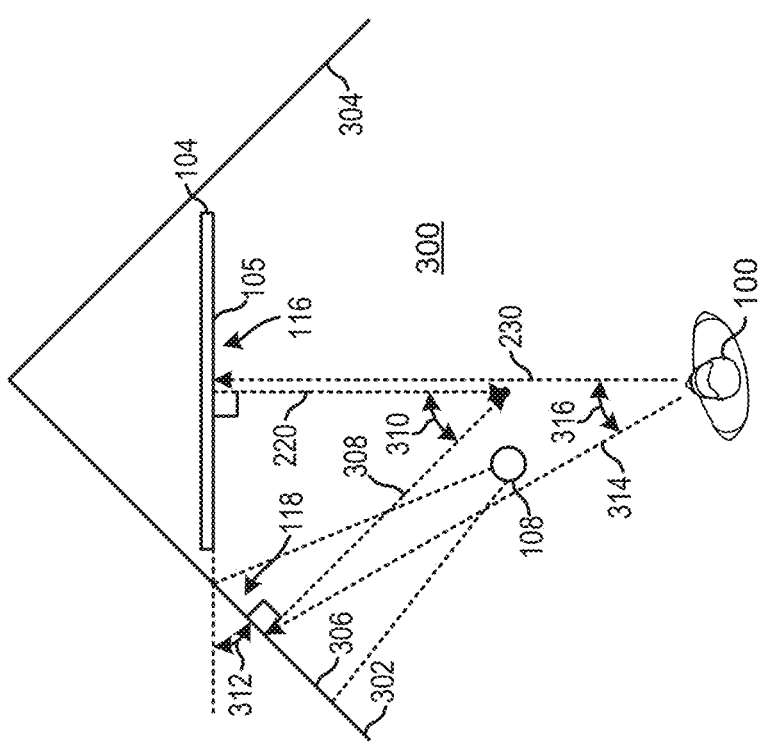
FIG. 3

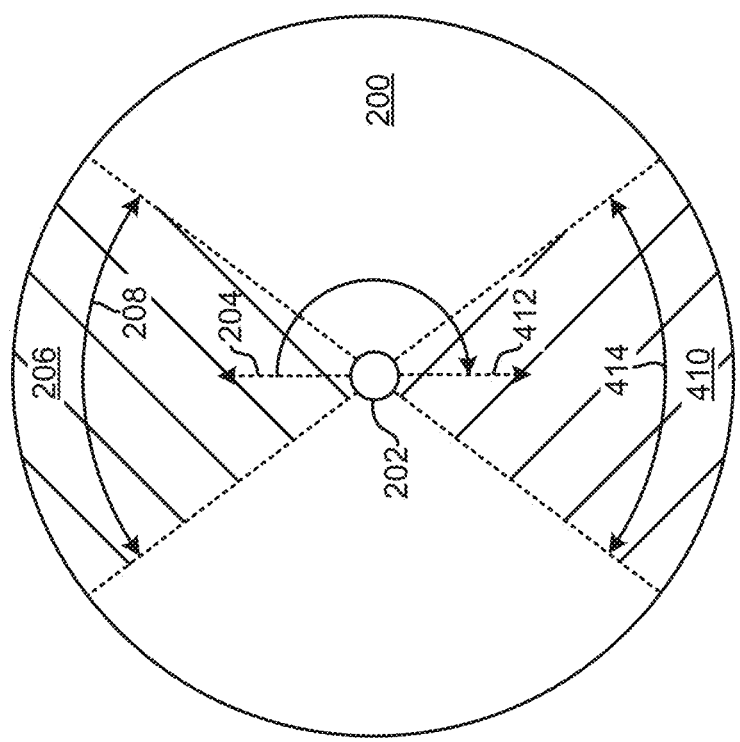
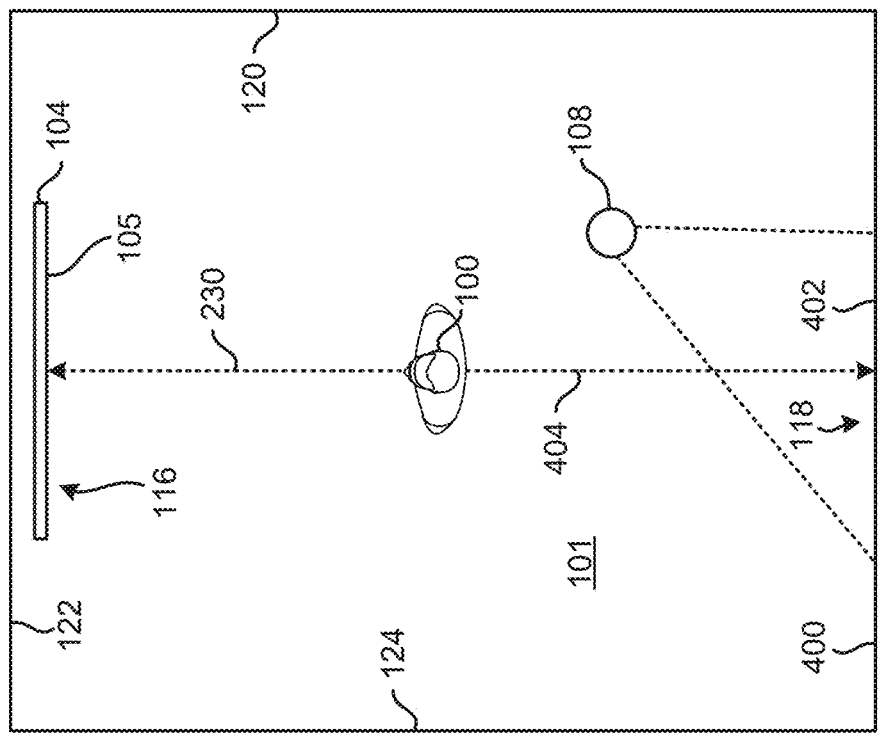
FIG. 4

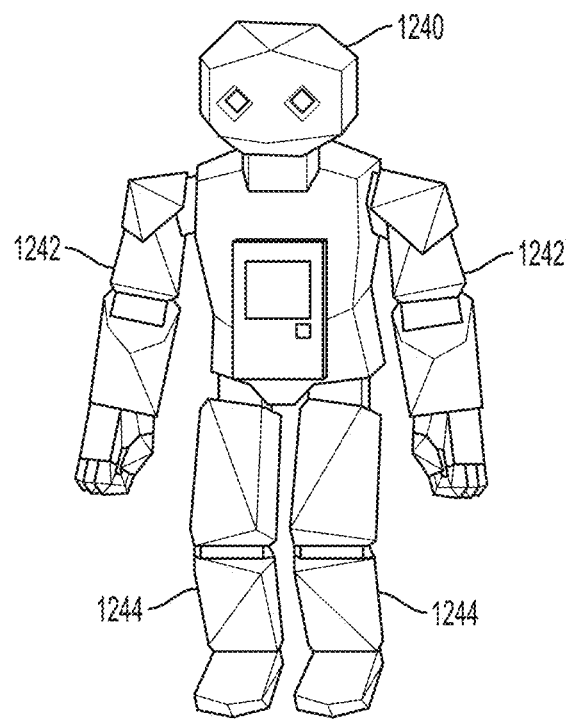
FIG. 12E
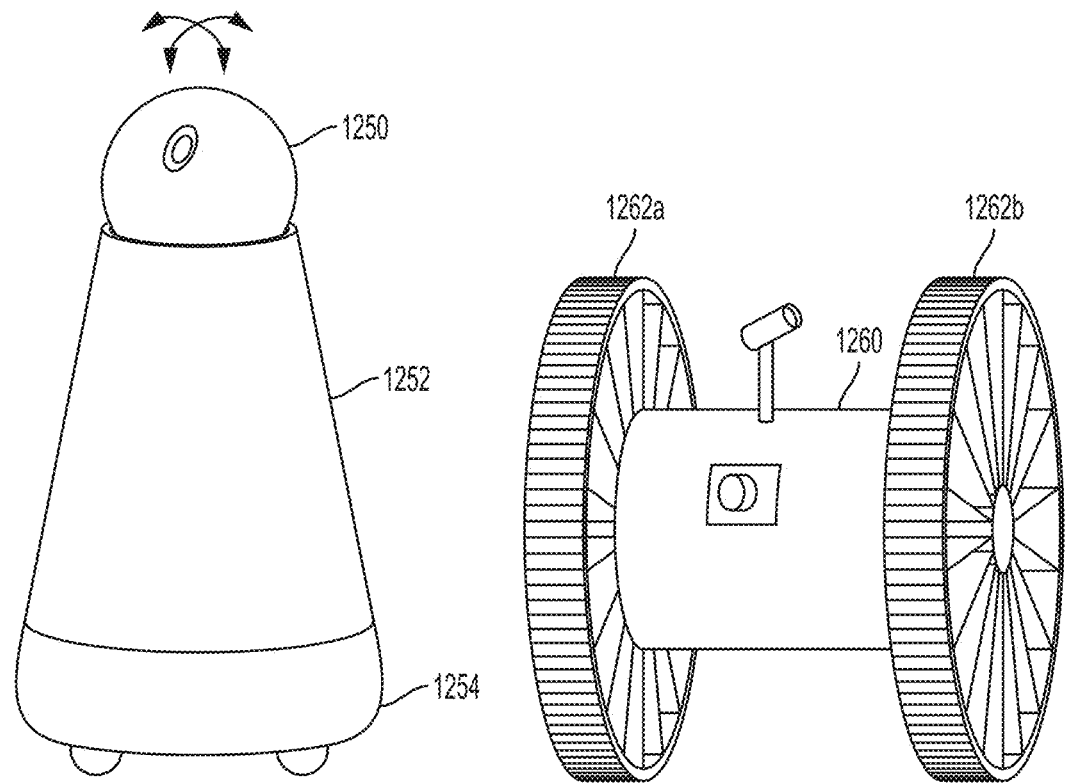
FIG. 12F
FIG. 12G

SPATIALLY AND USER AWARE SECOND SCREEN PROJECTION FROM A COMPANION ROBOT OR DEVICE

BACKGROUND

1. Field of the Disclosure

The present disclosure relates to spatially and user aware second screen projection from a companion robot or device, and related methods, apparatus, and systems.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce very detailed and engaging gaming experiences.

Example gaming platforms include the Sony Playstation®, Sony Playstation2® (PS2), Sony Playstation3® (PS3), and Sony Playstation4® (PS4), each of which is sold in the form of a game console. As is well known, the game console is designed to connect to a display (typically a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console may be further designed with an optical disc reader for receiving game discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between the user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

However, users typically view a virtual space through a display device such as a television or monitor, which limits the visual area through which the user is able to experience the virtual space.

It is in this context that implementations of the disclosure arise.

SUMMARY

Implementations of the present disclosure include devices, methods and systems relating to spatially and user aware second screen projection from a companion robot or device.

In some implementations, a system is provided, including the following: a computing device that executes a video game and renders a primary video feed of the video game to a display device, the primary video feed providing a first view into a virtual space that is defined by the executing video game; a robot, including, a camera that captures images of a user in a local environment in which the robot is disposed, a projector, and, a controller that processes the images of the user to identify a gaze direction of the user, and that communicates the gaze direction of the user to the computing device; wherein when the gaze direction of the user changes from a first gaze direction that is directed towards the display device, to a second gaze direction that is directed away from the display device and towards a projection surface in the local environment, the computing device generates a secondary video feed of the video game and transmits the secondary video feed of the video game to the robot, the secondary video feed providing a second view into the virtual space that is changed from the first view as determined by the change in the gaze direction of the user; wherein the controller of the robot activates the projector to project the secondary video feed onto the projection surface in the local environment.

In some implementations, the first view into the virtual space is a forward view defined from a perspective of a virtual object of the video game that is controlled by the user; wherein the second view into the virtual space is a side view defined from the perspective of the virtual object.

In some implementations, the change from the first to the second view into the virtual space includes an angular rotation from the first to the second view; wherein the change from the first to the second gaze direction includes an angular rotation from the first to the second gaze direction; wherein an amount of the angular rotation from the first to the second view is determined by an amount of the angular rotation from the first to the second gaze direction.

In some implementations, a display surface of the display device is oriented along a first plane; wherein the projection surface is oriented along a second plane that is not substantially parallel with the first plane.

In some implementations, the robot further includes at least one actuator that controls a direction of the camera, to enable the camera to capture the images of the user.

In some implementations, the robot further includes at least one actuator that controls a direction of the projector, to enable the projector to project the secondary video feed onto the projection surface.

In some implementations, the robot further includes at least one actuator that controls movement of the robot to different locations within the local environment, to enable the camera to capture the images of the user and/or to enable the projector to project the secondary video feed onto the projection surface.

In some implementations, a method is provided, including the following operations: using a robot to scan a local environment to identify a surface for projection of video thereon; determining a spatial relationship between a display device in the local environment and the identified surface; using the robot to track a gaze direction of a user in the local environment; when the gaze direction of the user is directed towards the display device, then rendering on the display device a primary view of a virtual space; when the gaze direction of the user is directed towards the identified surface, then using the robot to project a secondary view of the virtual space onto the identified surface, wherein a spatial relationship between the primary view and the secondary view in the virtual space is determined by the spatial relationship between the display device and the identified surface.

In some implementations, scanning the local environment to identify the surface for projection includes capturing images of the local environment by the robot, and analyzing the captured images of the local environment to identify a substantially flat surface having a predefined minimum size.

In some implementations, determining the spatial relationship between the display device and the identified surface includes determining locations and/or orientations of the display device and the identified surface in the local environment.

In some implementations, determining the spatial relationship between the display device and the identified surface includes determining an angle formed by an intersection between a first plane along which the display device is oriented and a second plane along which the identified surface is oriented.

In some implementations, using the robot to scan the local environment includes moving the robot to different locations within the local environment.

In some implementations, the primary view of the virtual space is defined by a first view frustum defined from a virtual viewpoint and having a first direction in the virtual space; wherein the secondary view of the virtual space is defined by a second view frustum defined from the virtual viewpoint and having a second direction in the virtual space.

In some implementations, a non-transitory computer readable medium having program instructions embodied thereon is provided, that when executed by a processer, cause said processor to perform a method including the following operations: using a robot to scan a local environment to identify a surface for projection of video thereon; determining a spatial relationship between a display device in the local environment and the identified surface; using the robot to track a gaze direction of a user in the local environment; when the gaze direction of the user is directed towards the display device, then rendering on the display device a primary view of a virtual space; when the gaze direction of the user is directed towards the identified surface, then using the robot to project a secondary view of the virtual space onto the identified surface, wherein a spatial relationship between the primary view and the secondary view in the virtual space is determined by the spatial relationship between the display device and the identified surface.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIG. 3 conceptually illustrates the generation of views of a virtual space presented through a display and via projection from a robot, in accordance with implementations of the disclosure.

FIG. 4 conceptually illustrates the generation of views of a virtual space presented through a display and via projection from a robot, in accordance with implementations of the disclosure.

FIGS. 12A-12G illustrate various types of robots, in accordance with implementations of the disclosure.

DETAILED DESCRIPTION

The following implementations of the present disclosure provide devices, methods, and systems relating to a spatially and user aware second screen projection from a companion robot or device. It will be obvious, however, to one skilled in the art, that the present disclosure may be practiced without some or all of the specific details presently described. In other instances, well known process operations have not been described in detail in order not to unnecessarily obscure the present disclosure.

Figure 1:
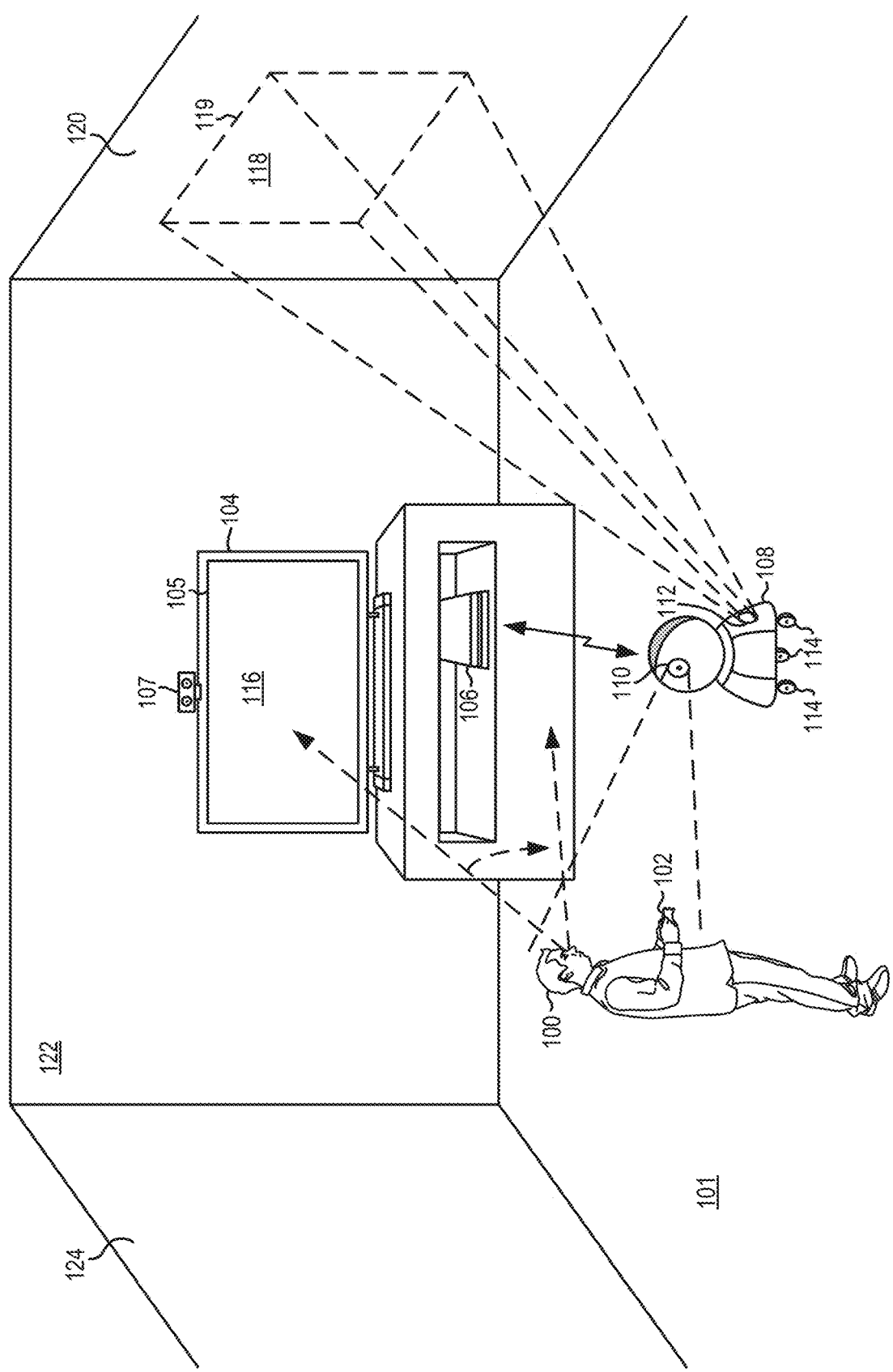
FIG. 1 illustrates a robot projection of a secondary view of a virtual space, in accordance with implementations of the disclosure.

FIG. 1 illustrates a robot projection of a secondary view of a virtual space, in accordance with implementations of the disclosure. In the illustrated implementation, a user 100 is shown interacting with a primary view 116 of a virtual space/environment that is rendered on a display 104. In some implementations, the virtual space is that of a video game. In other implementations, the virtual space is that of any type of application or platform that provides a virtual space or virtual environment with which the user may interact, including without limitation, locally executed interactive applications, cloud executed applications, cloud platforms, social networks, websites, telecommunications platforms, video conferencing, online chatrooms, etc. It will be appreciated that such applications or platforms supporting a virtual space can be configured to accommodate multiple users interacting in the same virtual space simultaneously.

In some implementations, the interactive application (e.g. a video game) that generates the virtual space is executed by a local computing device 106. The computing device can be any kind of device that may be configured to execute the interactive application to generate the virtual space, including without limitation, a gaming console, personal computer, laptop computer, set-top box, tablet, cellular phone, portable gaming device, etc. In some implementations, the computing device 106 is connected to a network, such as a local area network, wide area network, WiFi network, cellular network, the Internet, etc.

In some implementations, the computing device 106 is a thin client that communicates over the network (e.g. the Internet) with a cloud services provider to obtain the primary view 116 of the virtual space. That is, the interactive application is executed by the cloud services provider to generate the virtual space, and video data depicting the primary view of the virtual space is streamed over the network (e.g. the Internet) to the computing device 106, which then processes the video data to render the primary view 116 to the display 104.

In some implementations, the functionality of the computing device 106 is incorporated into the display 104.

In order to interact with the virtual space that is viewed through the display 104, the user 100 may operate an input device 102. The input device 102 can be any type of device useful for providing input to interact with the virtual space, including without limitation, a controller, motion controller, keyboard, mouse, trackpad, pointer, joystick, gaming peripheral, etc. In some implementations, wherein the virtual space is of a video game, the input device 102 enables the user 100 to provide input to the video game, to effect changes in the game state of the video game, such as by controlling actions (e.g. of a character or other virtual object) in the video game's context of gameplay. By way of example without limitation, examples of input devices can include video game controller devices such as the DualShock®4 Wireless Controller, the PlayStation®Move Motion Controller, and the Playstation®VR Aim Controller.

In some implementations, an image capture device 107 is configured to capture images of the interactive local environment 101. One example of an image capture device is the PlayStation®Camera. The computing device 106 can be configured to process and analyze the captured images to, by way of example without limitation, determine the location/orientation of an object in the local environment 101, such as the input device 102. In some implementations, the input device 102 may include a trackable feature, such as a light or other recognizable feature, that is recognized in the captured images and tracked, thereby providing for tracking of the location/orientation of the input device 102 in the local environment 101. Furthermore, images captured by the image capture device 107 may be analyzed to identify and track the user 100.

Also shown is a robot 108, which includes an image capture device 110 and a projector 112. The image capture device 110 captures images of the user 100, which are analyzed to determine the gaze direction of the user 100, that is the direction towards which the user is looking. This can be determined from tracking and analyzing aspects of the user's position and movements, such as the user's body position and posture, the position of the user's head, the position of the user's eyes, etc. Any technique for determining the gaze direction of a user based on image analysis can be applied, without departing from the scope of the present disclosure. In some implementations, the user 100, or any part of the user (e.g. legs, torso, neck, eyes, etc.), can be modeled to facilitate gaze tracking. In some implementations, certain parts of the user's body are tracked to enable tracking of the gaze direction of the user 100. In some implementations, the tracked parts of the user's body can be applied to the model to determine the gaze direction. It should be appreciated that the robot 108 can be configured to move to different locations and orientations in order to be able to track the user's gaze direction. For example, the robot 108 may reposition itself so that its image capture device 110 is able to capture (or continue to capture) images of the user's eyes.

It should be appreciated that in various implementations, the gaze tracking can be enabled by various pieces of information obtained through the robot 108 and/or through other devices in the system. In some implementations, the gaze direction of the user 100 is determined based on the aforementioned images captured by the image capture device 110 of the robot 108, in combination with a determined position/orientation of the robot 108 in the local environment 101. In some implementations, the position/orientation of the robot 108 is determined, at least in part, based on information sensed or processed by the robot itself, including by way of example without limitation, data from motion sensors (e.g. accelerometers, gyroscopes, magnetometers, inertial motion units (IMU's), images captured by the image capture device 110, network positioning (e.g. GPS, WiFi positioning), simultaneous localization and mapping (SLAM), etc. In some implementations, the location/orientation of the robot 108 is determined, at least in part, based on analysis of images captured by the image captured device 107. In some implementations, the robot 108 includes one or more magnetic sensors configured to sense one or more magnetic fields emitted by one or more magnetic emitters positioned in the local environment 101, and the location/orientation of the robot 108 can be determined, at least in part, based on such data.

In some implementations, the location/orientation of the controller 102 is determined and tracked, and this is used to enable, at least in part, the tracking of the user's gaze direction. In various implementations, the location/orientation of the controller 102 can be tracked based various information, including by way of example without limitation, analysis of images captured by the image capture device 107, sensor data detected by motion sensors in the controller 102 (e.g. accelerometers, gyroscopes, magnetometers, IMU's), one or more magnetic sensors that sense magnetic fields emitted by one or more magnetic emitters, images captured by an image captured device included in the controller 102, network positioning, etc. The gaze direction of the user 100 can be determined relative to, or as an offset from, the location/orientation of the controller 102. For example, in some implementations, the location/orientation of the controller 102 can be determined and tracked as described above, and the image capture device 110 of the robot 108 may capture images including the controller 102 as well as the user 100. Using the known location/orientation of the controller 102 in the local environment 101, and analyzing the captured images by the image capture device 110 of the robot 108, the gaze direction of the user 100 relative to the controller 102 can be determined and tracked.

In some implementations, the locations/orientations of the robot 108 and the controller 102 are separately determined, and using this information along with analysis of images of the user captured by the image capture device 110 of the robot 108, the gaze direction of the user 100 relative to the controller 102 and/or the robot 108 can be determined.

In some implementations, the controller 102 includes an image capture device (not shown) that is configured to capture images of the user 100 during operation by the user 100 (e.g. configured to be aimed towards the user 100 when the controller 102 is held by the user). Such images can be transmitted to the robot 108, along with sensor data detected by the controller 102, and such may be used by the robot 108 to determine the gaze direction of the user 100.

The robot 108 includes the projector 112, that is configured to project a secondary view 118 of the virtual space onto a surface in the local environment 101. The surface can be any suitable surface in the local environment 101 onto which images or video can be projected and viewed by the user 100. In some implementations, suitable surfaces can be any substantially flat surfaces with substantially or mostly uniform coloration. It will be appreciated that suitable surfaces may also have predefined minimum dimensions or size. The robot 108 can be configured to scan a local environment, such as a room, to identify one or more surfaces suitable for projection thereon. By way of example, without limitation, surfaces for projection thereon can include a wall (e.g. walls 120, 122, or 124 in the illustrated implementation), a ceiling, a projector screen, a screen/shade, curtains/drapery, etc.

The robot 108 can move to a position in the local environment so as to be able to project the secondary view of the virtual space onto a suitable surface. For example, the robot 108 may reposition itself so as to avoid obstacles or other objects that may interfere with projection.

In the illustrated implementation, the projector 112 projects the secondary view 118 of the virtual space onto the wall 120, which is a side wall relative to the display surface 105 of the display device 104. That is, the display surface 105 of the display device 104, on which the primary view 116 is rendered, defines a front surface that is viewed by the user 100 when the user's gaze direction is directed in a forward direction. Whereas the side wall 120 defines a side surface that is viewed by the user 100 when the user's gaze direction is directed in a sideward direction (relative to the forward direction). In the illustrated implementation, the wall 120 is approximately perpendicular to the display surface 105 of the display device 104, and to the front wall 122. However, it will be appreciated that in other implementations, the orientation of the illustrated walls, relative to each other and to the display surface 105 of the display device 104, may vary.

The secondary view 118 that is projected on the wall 120 is configured to be spatially correct relative to the primary view 116. That is, the secondary view 118 provides a view of the virtual space that is spatially related (in the context of the virtual space) to the primary view 116 of the virtual space, in a manner that is determined by, or similar to, or based on, the spatial relationship of the surfaces on which the primary and secondary views are rendered (e.g. the display 104 and the region 119 of the wall 120 where the view 118 is projected). For example, the primary view 116, that is rendered to the display 104 in front of the user 100, may be a frontward view that is from the perspective of a virtual viewpoint in the virtual space; whereas the secondary view 116, projected on the side wall 120, may be a sideward view from the perspective of the virtual viewpoint. This can be based, at least in part, on the positioning and orientation of the display 104 and the wall 120 relative to each other.

In some implementations, the virtual viewpoint is defined by the location of a virtual object controlled by the user 100, such as a virtual character/person, a virtual vehicle, a virtual weapon, etc. The virtual viewpoint is a location in the virtual environment from which a view of the virtual environment can be generated.

In some implementations, the secondary view 118 is projected by the robot 108 in conjunction with the rendering of the primary view 116 on the display 104.

In some implementations, the secondary view 118 is projected by the robot 108 when the gaze direction of the user 100 is directed towards the wall 120, or the projection region 119 of the wall 120 where the view 118 is projected. Further, in some implementations, the projection of the secondary view 118 may be deactivated when the user's gaze direction is not directed toward the wall 120, or the region 119 of the wall 120 where the view 118 is projected. The secondary view 118 can thus be provided in an on-demand fashion, depending on whether the gaze direction of the user 100 is directed towards the wall or region where the secondary view will be projected.

In some implementations, the projection of the secondary view 118 is activated when it is determined that the user's gaze direction is changing towards, or moves past a threshold amount towards, being directed at the wall 120 or the region 119 where the secondary view 118 is to be projected.

In some implementations, when the secondary view 118 is not projected on the wall 120, the region where it would be projected can be indicated to the user 100 by projecting an indicator or marking. For example, an outline, or portions of an outline (e.g. corner indicators), of the region where the secondary view 118 would be displayed can be shown projected. In some implementations, a center indicator of the region can be projected. It will be appreciated that practically any type of marking or indicator could be projected, to indicate the projection region where the secondary view would be projected, including without limitation, crosshairs, any type of shape, a logo, a game title, word(s), letter(s), an icon, a game-related graphic/icon (e.g. a character or other item), a pattern, an animation, etc. By showing where the secondary view 118 will be projected, the user 100 can more easily determine where to look to see the secondary view 118 when desired.

In some implementations, the secondary view 118 is also generated by the computing device 106, or more specifically the interactive application executing on the computing device 106. A video stream depicting the secondary view 118 can be transmitted/streamed to the robot 108 from the computing device 106, and the projector 112 of the robot 108 can be activated to render the video stream, thereby defining the projection of the secondary view 118.

In some implementations, prior to initiating projection of a secondary view by the robot, certain verifications or qualification checks are performed. For example, in some implementations, the system first verifies that the user is engaged in interacting with the media being shown on the display such as the virtual space. In some implementations, this may entail identifying and tracking the user, including tracking the user's gaze direction to ascertain whether the user is interacting with the media or virtual space. In some implementations, the controller device is identified, as well as the user, and it is determined whether the user is interacting by using the controller device. When multiple persons are present, the system may identify which of the persons is actually interacting with the virtual space, such as by identifying the location of the controller device and determining which user is operating the controller device, tracking the gaze directions of the persons, etc.

Figure 2:
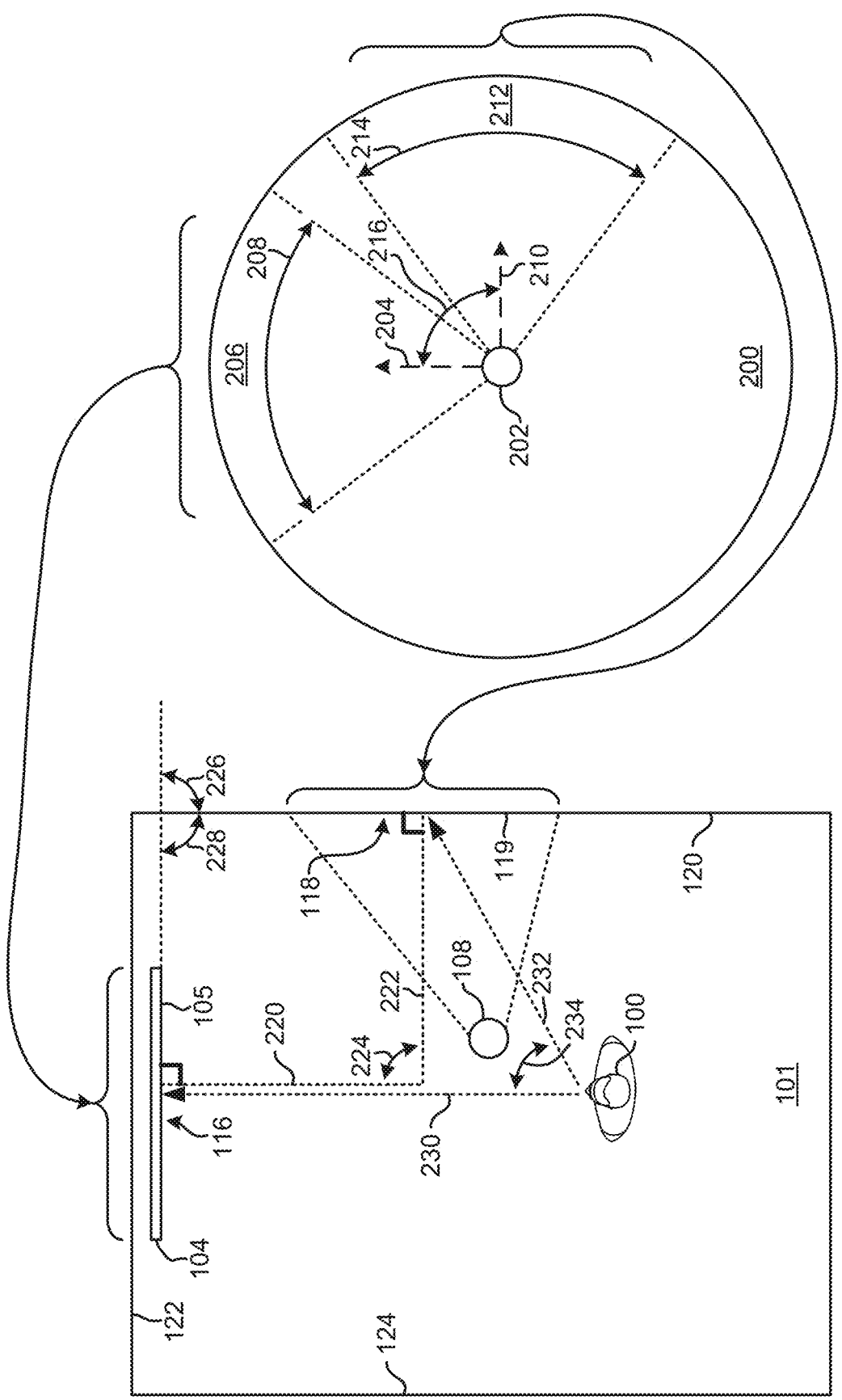
FIG. 2 conceptually illustrates the generation of the views of the virtual space presented through the display and via the robot, in accordance with implementations of the disclosure.

FIG. 2 conceptually illustrates the generation of the views of the virtual space presented through the display and via the robot, in accordance with implementations of the disclosure. At left, an overhead view of the local environment 101 is shown, in which the user 100 is located, along with the display 104 and the robot 108. At right, an overhead view of a virtual space 200 is conceptually shown, which in some implementations, is a virtual space of a video game or other interactive application. In some implementations, the virtual space 200 is a three-dimensional space in which gameplay activity of a video game occurs.

In order to provide views of the virtual space 200 for rendering, a virtual viewpoint 202 is defined, which is a location in the virtual space 200 from which a view of the virtual environment is generated. That is, a view of the virtual environment can be generated from the perspective of the virtual viewpoint 202. In the illustrated implementation, the primary view 116 is defined by a view frustum 206 from the perspective of the virtual viewpoint 202. As shown, the view frustum 206 has a direction 204 (e.g. is centered about the direction 204) in the virtual space 200. The view frustum 206 defines the field of view or the region of the virtual space 200 that is captured in the primary view 116 for rendering.

As noted, the illustrated view is a conceptual overhead view of the virtual space 200, and thus, only the horizontal aspect of the view frustum is shown. However, it will be appreciated that the vertical aspect of the view frustum is appropriately sized in accordance with the aspect ratio of the view that is desired. By way of example, without limitation, the aspect ratio (ratio of width to height) can be 16:9, 4:3, 3:2, etc. in accordance with various implementations of the disclosure. For ease of explanation with reference to the illustrated implementation, reference is generally made to the horizontal aspect of a view frustum. But it will be appreciated by those skilled in the art that the vertical aspect of the view frustum also exists, and statements made with regard to the horizontal aspect of the view frustum also typically apply to the vertical aspect.

By way of example without limitation, in a typical console video game, the view frustum 206 for a view to be rendered to a typical display device, such as a television or other display, is configured to have a horizontal field of view (ref. 208) that is approximately in the range of about 50 to 70 degrees. In some implementations, the view frustum 206 defines a horizontal field of view of about 60 degrees. In other implementations, the view frustum 206 defines a horizontal field of view of less than 50 degrees or greater than 70 degrees. In some implementations, the view frustum 206 defines a horizontal field of view of about 90 degrees.

In some implementations, the secondary view 118 is defined by a view frustum 212 originating from the viewpoint 202, but having a direction 210 that is rotated relative to the direction 204. In some implementations, the angle (ref. 216) between the direction 204 and the direction 210 is determined by a spatial relationship between the display surface 105 and the projection surface/region 119 for the display of the secondary view (e.g. a region of the wall 120). For example, in some implementations, the angle 216 is determined by an angular relationship between the display surface 105 and the projection surface 119, such as the angular difference between intersecting vectors (e.g. vectors 220 and 222) that are respectively orthogonal to the display surface 105 of the display 104 and the projection surface 119 of the wall 120. That is, considering a first vector 220 that is normal to the display surface 105 and which intersects a second vector 222 that is normal to the projection surface 119, then the angle between the vectors determines the angle 216 between the directions 204 and 210 of the view frustums which determine the views 116 and 118 shown on the display 104 and the region 119 of the wall 120, respectively.

In some implementations, the angle 216 is substantially the same as the angle between the aforementioned vectors. Thus, if the aforementioned vectors are approximately perpendicular to each other, then the view frustum directions 204 and 210 are approximately perpendicular to each other, and the angle 216 is approximately 90 degrees. That is, when the display 104 and the projection surface is a lateral surface that is orthogonal to the display surface 105 of the display 104, then the (central) directions of the primary and secondary views in the virtual space 200 will be perpendicular to each other. In another example, when the projection surface is a lateral surface intersecting the plane of the display 104 at an angle of approximately 120 degrees, then the intersection of normal vectors will form an angle of approximately 60 degrees, and the angle 216 between the directions 204 and 210 of the views in the virtual space will be approximately 60 degrees.

It will be appreciated that the above description of intersecting vectors applies when the display 104 and the projection region 119 of the wall 120 are approximately horizontally aligned, or rather, have similar vertical positions, so that normal vectors may intersect. However, in the scenario where this is not the case, then intersecting vertical planes that are respectively normal to the display 104 and the projection region 119 of the wall 120 can be substituted, and their angle of intersection can determine the angle 216, in accordance with implementations of the disclosure.

Another way of describing a similar relationship is that the angle 216 between the primary and secondary views is determined by, and/or positively correlated to, the external angle 226 between the plane of the display surface 105 and the plane of the projection surface 119. The internal angle 228 between the plane of the display surface 105 and the plane of the projection surface 119 faces the local environment, whereas the value of the external angle 226 is equal to 180 degrees minus the value of the internal angle 228. In some implementations, the angle 216 is the same as, or substantially similar to, the external angle 226.

In some implementations, the horizontal field of view (ref. 214) of the view frustum 212 is the same as, or substantially similar to, the horizontal field of view (ref. 208) of the view frustum 206 (and also the respective vertical fields of view can be the same or substantially similar). However, in other implementations, the horizontal field of view 214 may have an angular value that is greater than or less than that of the horizontal field of view 208 (and likewise the respective corresponding vertical fields of view). For example, in some implementations, the size of the projection of the secondary view 118 may be larger than the display of the primary view 116 on the display 104, and therefore the field of view (including both horizontal and vertical) of the secondary view 118 may be greater than the field of view of the primary view 116. Conversely, in some implementations, the size of the projection of the secondary view 118 may be smaller than the display of the primary view 116 on the display 104, and therefore the field of view of the secondary view 118 may be smaller than the field of view of the primary view 116. That is, in some implementations, the size of the field of view of the projected secondary view 118 is positively correlated to the size of the projection itself. And further, in some implementations, the size of the field of view of the secondary view 118 is dependent on the size of the projection of the secondary view 118 relative to the size of the rendered primary view 116 on the display 104, such that when the size of the projection of the secondary view is greater than the size of the rendered primary view, then the size of the field of view of the secondary view is greater than the size of the field of view of the primary view; and when the size of the projection of the secondary view is smaller than the size of the rendered primary view, then the size of the field of view of the secondary view is smaller than the size of the field of view of the primary view.

In some implementations, the size of the field of view of the secondary view 118 is determined by the positioning of the projection surface 119 relative to the display surface 105 of the display 104. As noted, in some implementations, the vector 220 is orthogonal to the display surface 105, and intersects the vector 222 which is orthogonal to the projection surface 119. The vectors 220 and 222 are horizontally centered with respect to the display surface 105 and the projection surface 119, respectively. The vector 220 has a distance defined from the point of intersection to the display surface 105; and the vector 222 has a distance defined from the point of intersection to the projection surface 105. In some implementations, the size of the field of view of the secondary view 118 is determined by the relative amounts of the distances defined by the vectors 220 and 222. For example, in some implementations, as the distance of vector 222 increases relative to the distance of vector 220, then the field of view of the secondary view 118 decreases relative to the field of view of the primary view 116 (e.g. the angle 214 of the view frustum 212 decreases relative to the angle 208 of the view frustum 206). Conversely, as the distance of vector 222 decreases relative to the distance of vector 220, then the field of view of the secondary view 118 increases relative to the field of view of the primary view 116 (e.g. the angle 214 of the view frustum 212 increases relative to the angle 208 of the view frustum 206). Intuitively, this provides for an increase in the field of view of the secondary view 118 when the secondary view 118 is projected closer to the user 100, and a decrease in the field of view of the secondary view 118 when the secondary view 118 is projected further away from the user 100.

With continued reference to FIG. 2, in some implementations, the relationship of the primary and secondary views to each other is determined by the spatial relationship of the user 100 relative to the display 104 and the projection surface 119. For example, in some implementations, a vector 230 from the user 100 to the display 104 (e.g. center of the display surface 105) is defined; and a vector 232 from the user 100 to the projection surface 119 (e.g. center of the projection surface 119) is also defined. In some implementations, the angle 234 between the vectors 230 and 232 determines the angle 216 between the directions 204 and 210 for the primary and secondary views of the virtual space 200, respectively. In some implementations, the angle 216 between the view directions 204 and 210 in the virtual space is the same as, or substantially the same as the angle 234 between the vectors 230 and 232 in the local environment 101. In other implementations, the angle 216 is scaled to the angle 234, e.g. by a scaling factor, which may be constant or variable in various implementations.

In some implementations, the size of the field of view of the secondary view 118 can be determined by the relative distances of the user 100 to the display surface 105 of the display 104 and the projection surface 119. For example, in some implementations, as the distance from the user 100 to the projection surface 119 increases relative to the distance from the user 100 to the display, then field of view of the secondary view 118 decreases relative to the field of view of the primary view 116. In other words, as the distance of vector 232 increases relative to the distance of vector 230, then the size of the field of view of the view frustum 212 decreases; whereas as the distance of vector 232 decreases relative to the distance of vector 230, then the size of the field of view of the view frustum 212 increases. Intuitively, this provides for a larger field of view for the secondary view 118 when it is projected more closely to the user 100, and for a smaller field of view for the secondary view 118 when it is projected further away from the user 100.

In some implementations, the secondary view 118 is configured to be contiguous and/or overlapping with the primary view 116. For example, the field of view of the secondary view 118 can be configured to be laterally contiguous and/or overlapping with the field of view of the primary view 116. With reference to FIG. 2, for example, the view frustums 206 and 212 may share a lateral side, or their lateral sides may overlap each other. The angle 216 between the view directions 204 and 210 can be configured to provide for such contiguity and/or overlapping configuration. In such implementations, then the user 100 will be able to see adjacent portions of the virtual space 200 when transitioning from the primary view to the secondary view or vice versa, without any gap in view coverage.

In some implementations, the size of the field of view of the secondary view 118 is adjusted so as to be contiguous and/or overlapping with, the field of view of the primary view 116. In some implementations, this occurs in conjunction with adjustment of the size of the projection of the secondary view 118 as previously described.

In some implementations, the relationship between the primary view 116 and the secondary view 118 is fixed at a predefined spatial relationship in the virtual space 200. For example, the secondary view 118 is rotated by a predefined amount relative to the primary view in the virtual space 200. In some implementations, the robot 108 is configured to determine whether a suitable projection surface exists in the local environment 101 for such a secondary view, and if so, then the secondary view 118 can be projected. Determining whether a suitable projection surface exists can include determining whether a surface in the local environment has an appropriate orientation relative to the display 104 on which the primary view is rendered, such as being perpendicular to, or within a predefined range of being perpendicular to, the plane of the display surface 105 of the display 104. In some implementations, determining whether a suitable projection surface exists can also include determining whether a potential projection surface is within a predefined distance, or within a predefined distance range (that establishes minimum and maximum distances), of the display 104.

FIG. 3 conceptually illustrates the generation of views of a virtual space presented through a display and via projection from a robot, in accordance with implementations of the disclosure. At left, an overhead view of a local environment 300 is shown, in which the user 100 is located, along with the display 104 and the robot 108. As shown, the local environment 300 can be defined by a room, and may be bounded by walls 302 and 304 of the room. At right, an overhead view of the virtual space 200 is conceptually shown, which in some implementations, is a virtual space of a video game or other interactive application. As noted, in some implementations, the virtual space 200 is a three-dimensional space in which gameplay activity of a video game occurs.

In the illustrated implementation, the display device 104 is placed in the corner area where the walls 302 and 304 adjoin, facing outward from the corner at an angle relative to each of the walls. In this configuration, the walls 302 and 304 define planes (and possible projection surfaces) that are not perpendicular to, nor parallel to, the plane of the display surface 105 of the display device 104. Rather, the walls are angled towards the user 100 in a manner that makes them useful for providing additional views of the virtual space to the user.

As shown, the primary view 116 of the virtual space 200 is rendered through the display surface 105 of the display 104. The robot 108 projects the secondary view 118 of the virtual space 200 onto a projection surface 306, which is a sub-region of the wall 302 that is suitable for projection of video. As has been described, a given view of the virtual space 200 is defined by a view frustum in the virtual space, that is defined from a perspective of a virtual viewpoint and having a given view direction in the virtual space. In the illustrated implementation, the primary view 116 of the virtual space 200 is defined by a view frustum 206 having a view direction 204 (through the center of the view frustum 206) in the virtual space and which originates from (is defined from the perspective of) the virtual viewpoint 202.

In some implementations, the secondary view 118 that is projected by the robot 108 is a view of the virtual space 200 that is adjacent to the primary view 116 in the virtual space. That is, the view frustum which defines the secondary view 118 is adjacent to the view frustum which defines the primary view. This is shown in the illustrated implementation, wherein the secondary view 118 is defined by the view frustum 322, which is adjacent to the view frustum 206 that defines the primary view 116. The secondary view 118 is thus contiguous with the primary view 116, affording the user 100 a continuous view of the virtual space when transitioning between viewing the display 104 (the primary view) and viewing the projection surface 306 (the secondary view). The view frustum 206 has a view direction 204 and a field of view 208; the view frustum 322 has a view direction 320 and a field of view 324 that are configured to provide for positioning of the view frustum 322 adjacent to the view frustum 206.

It will be appreciated that the lateral relationship of the view frustums is consistent with that of the rendering surfaces in the local environment 300. That is, as the projection surface 306 is laterally to the left of the display surface 105 of the display device 104, so the view frustum 322 that defines the secondary view is laterally to the left of the view frustum 206 that defines the primary view in the virtual space.

While the primary and secondary views of the virtual space may be adjacent views in some implementations, in other implementations, the primary and secondary views 116 and 118 can be determined from other aspects of the system, in accordance with techniques described herein. For example, the angle 326 between the view direction 204 for the primary view 116 and the view direction 320 for the secondary view 118 can be determined by the external angle 312 between the plane of the display surface 105 of the display device 104 and the plane of the projection surface 306 (or the wall 302). The external angle 312 is the same as the angle 310, which is between intersecting vectors 220 and 308, which are respectively orthogonal to the display surface 105 and the projection surface 306. The angle 326 defines the amount by which the secondary view 118 is turned relative to the primary view 116.

In some implementations, the angle 326 is determined by the angle 316, which is the angle between the vectors 230 and 314, that are directed from the user 100 to the center of the display surface 105 and the center of the projection surface 306, respectively. The vectors 230 and 314 are indicative of the gaze direction of the user 100 when viewing the display 104 and the projection from the robot, respectively.

Furthermore, the field of view 208 of the primary view 116 and the field of view 324 of the secondary view 118 can be configured based on various factors, as described herein, including without limitation, relative distance of the user 100 to each of the display 104 and the projection surface 306, relative sizes of the display surface 105 and the projection surface 306, etc.

FIG. 4 conceptually illustrates the generation of views of a virtual space presented through a display and via projection from a robot, in accordance with implementations of the disclosure. At left, an overhead view of a local environment 101 is shown, in which the user 100 is located, along with the display 104 and the robot 108. As shown, the local environment 101 can be defined by a room, and may be bounded by walls 120, 122, 124, and 400 of the room. At right, an overhead view of the virtual space 200 is conceptually shown, which in some implementations, is a virtual space of a video game or other interactive application. As noted, in some implementations, the virtual space 200 is a three-dimensional space in which gameplay activity of a video game occurs.

In the illustrated implementations, the back wall 400 is positioned opposite the front wall 122, and the robot 108 is configured to project the secondary view 118 onto the back wall 400, and more specifically onto a projection surface 402 that is a region of the back wall 400. The projection surface 402 is configured so as to be substantially opposite the display surface 105 of the display device 104. In other words, in order to view the projection surface 402, the user 100 turns around, or rotates their gaze direction by approximately 180 degrees from being directed towards the display 104, to being directed towards the back wall 400, and more specifically, towards the projection surface 402 on which the secondary view 118 is projected.

As shown, the primary view 116 is defined by the view frustum 206, having a view direction 204 and a field of view 208 in the virtual space 200. The secondary view 118 is defined by the view frustum 410, having a view direction 412 and a field of view 414 in the virtual space 200. In some implementations, the view direction 412 of the view frustum 410 is approximately opposite the view direction 204 of the view frustum 206, or rotated by approximately 180 degrees in the virtual space 200. Thus, a view of the virtual space 200 in the opposite direction from the primary view 116 can be shown as the secondary view 118. In this manner, the user 100 is able to intuitively see what is "behind" them in the virtual space 200 by simply turning around to look in a direction opposite/away from the display 104.

Figure 5:
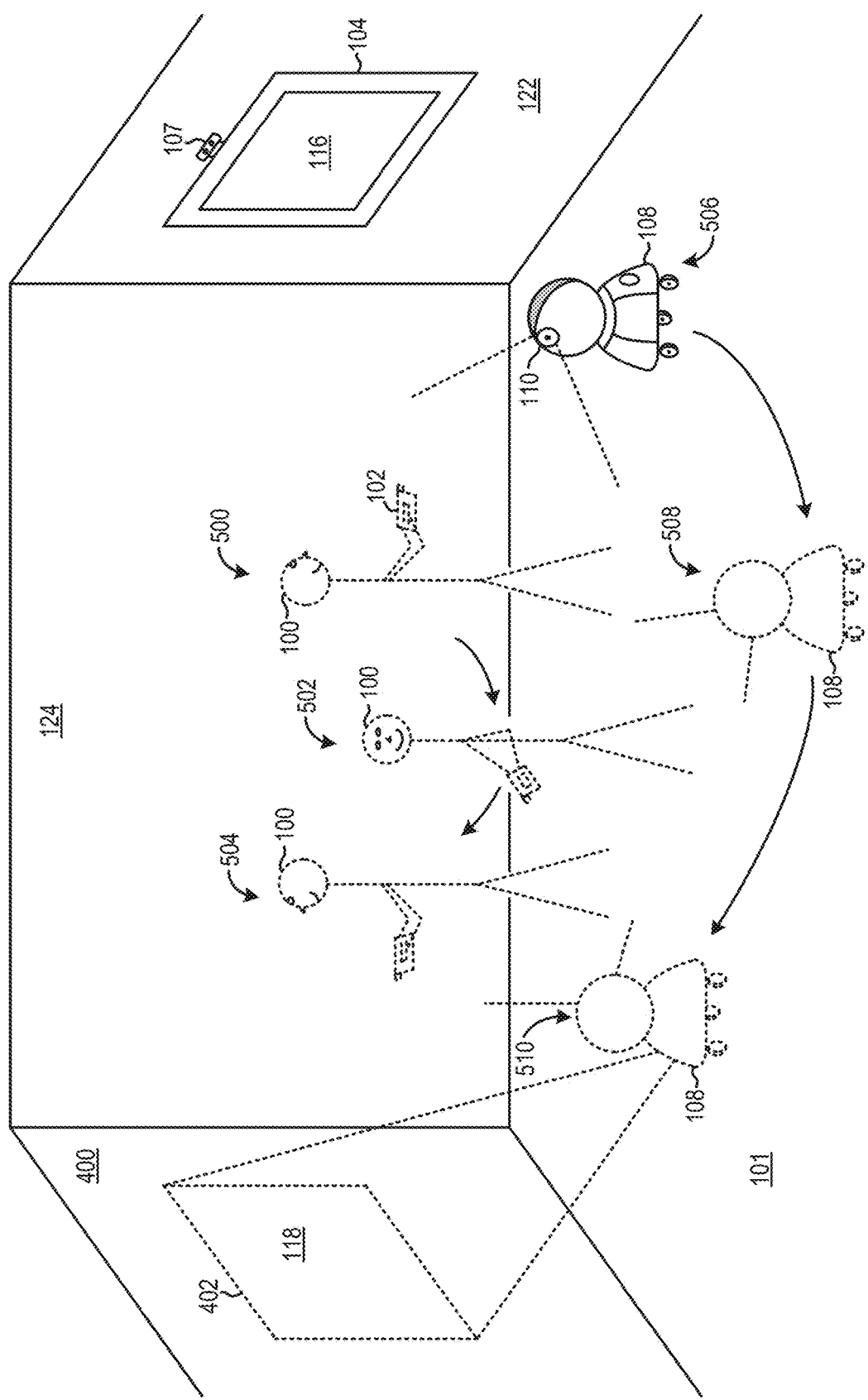
FIG. 5 illustrates movement of a robot to enable tracking of the gaze direction of a user interacting with a virtual space, in accordance with implementations of the disclosure.

FIG. 5 illustrates movement of a robot to enable tracking of the gaze direction of a user interacting with a virtual space, in accordance with implementations of the disclosure. As shown, the user 100 is in the local environment 101 at a position 500, viewing a primary view 116 of the virtual space on the display 104. In some implementations, the display 104 is approximately aligned with the front wall 122 as shown. When the user 100 is located at the position 500 and having a gaze direction that is towards the display 104, the robot 108 can be configured to be positioned at a location 506 that affords a view of the user's eyes by the robot's camera 110, to enable detection of the gaze direction of the user 100. That is, the robot 108 is capable of moving or repositioning itself so as to position its camera 110 to be able to capture images of the user's eyes.

For example, when the user 100 turns or moves to a location 502, and the user's gaze direction is directed to a side (relative to the direction towards the display 104), e.g. towards the side wall 120, then the robot 108 may move to the location 508, so that the camera 110 of the robot 108 is able to capture images of the user's eyes. By moving to the location 502, the robot 108 is repositioned so as to approximately stay positioned at a front side of the user 100. Additionally, the location 502 may be further chosen to enable the projector 112 of the robot 108 to project a secondary view 118 on the side wall 120, as described above.

Further and in a similar manner, when the user 100 turns or moves to a location 504, and the user's gaze direction is directed towards the back of the room, or more specifically towards the back wall 400 and the projection surface 402, then the robot 108 moves to the location 510, so that the camera 110 of the robot 108 is able to capture images of the user's eyes. By moving to the location 510, the robot 108 is repositioned so as to approximately stay positioned at the front side of the user 100. Additionally, the location 502 may be further chosen to enable the projector 112 of the robot 108 to project a secondary view 118 on the back wall 400, as described above.

To enable determination and tracking of the gaze direction of the user 100, the robot 108 may employ image recognition techniques to analyze the captured images from the camera 110 and identify the position and orientation of the user's body, head, and/or eyes. In some implementations, the robot 108 is configured to model the user's body, head, and/or eyes, and update the model based on analysis of the captured images, and further use the model to determine the gaze direction of the user 100. Using image analysis, the robot 108 determines when the user moves or turns, and the robot 108 adjusts its position in the local environment 101 accordingly to enable tracking of the user's gaze direction, which can include ensuring that the camera 110 is able to capture images that include the user's eyes (i.e. that the user's eyes are in the field of view of the camera 110).

In some implementations, the robot 108 is configured to position itself within a predefined region relative to the user 100 so as to enable tracking of the user's gaze direction. The predefined region for gaze tracking can be a region relative to the user 100 from which the camera 110 of the robot 108 is able to capture images of the user's eyes, or sufficiently capture images of the user 100 in general to enable accurate tracking of the user's gaze direction.

In some implementations, the robot 108 is configured to maintain a predefined distance from the user 100, if possible. This may be useful for enabling the image capture of the user's eyes for gaze tracking, and may also prevent the user from accidentally contacting or tripping over the robot 108, thereby ensuring the user's safety.

Further, in some implementations, the robot 108 is configured to position itself within a predefined region relative to a projection surface onto which the robot 108 is to project a secondary view of the virtual space. In order to properly project the secondary view onto the projection surface (e.g. so as to the have proper dimensions when projected, such as having the desired size and consistent width/height throughout its width/height), the projector 112 of the robot 108 may be positioned within the predefined region relative to the projection surface.

It will be appreciated that a combination of the above-described parameters can be conceived, and the robot 108 can thus be configured to position itself within a region that is an intersection of the above-described predefined regions relative to the user and/or to the projection surface. That is, the robot 108 can be configured to move itself to a location so as to fulfill the various requirements, such as enabling gaze tracking, enabling proper projection, and ensuring safety of the user 100 and the robot 108.

In some implementations, the robot 108 is configured to provide for adjustment of the direction of the camera 110 independent of the direction of the projector 112. For example, the camera 110 and/or the projector 112 may be articulated in one or more directions, along or around one or more axes, etc. In this manner, the camera 110 and the projector 112 can be directionally adjusted independently.

Furthermore, in some implementations, the robot employs gaze prediction so that it can move to the optimal location before the user looks in a direction. For example, in some implementations, the robot is fed metadata from the video game that indicates the direction of future game content. The robot may then predictively move to various locations as necessary in order to be optimally positioned to project the secondary view. In some implementations, the robot employs a neural network or other machine learning construct that predicts the future gaze direction of the user, and the robot may move accordingly based on the predicted future gaze direction.

Figure 6:
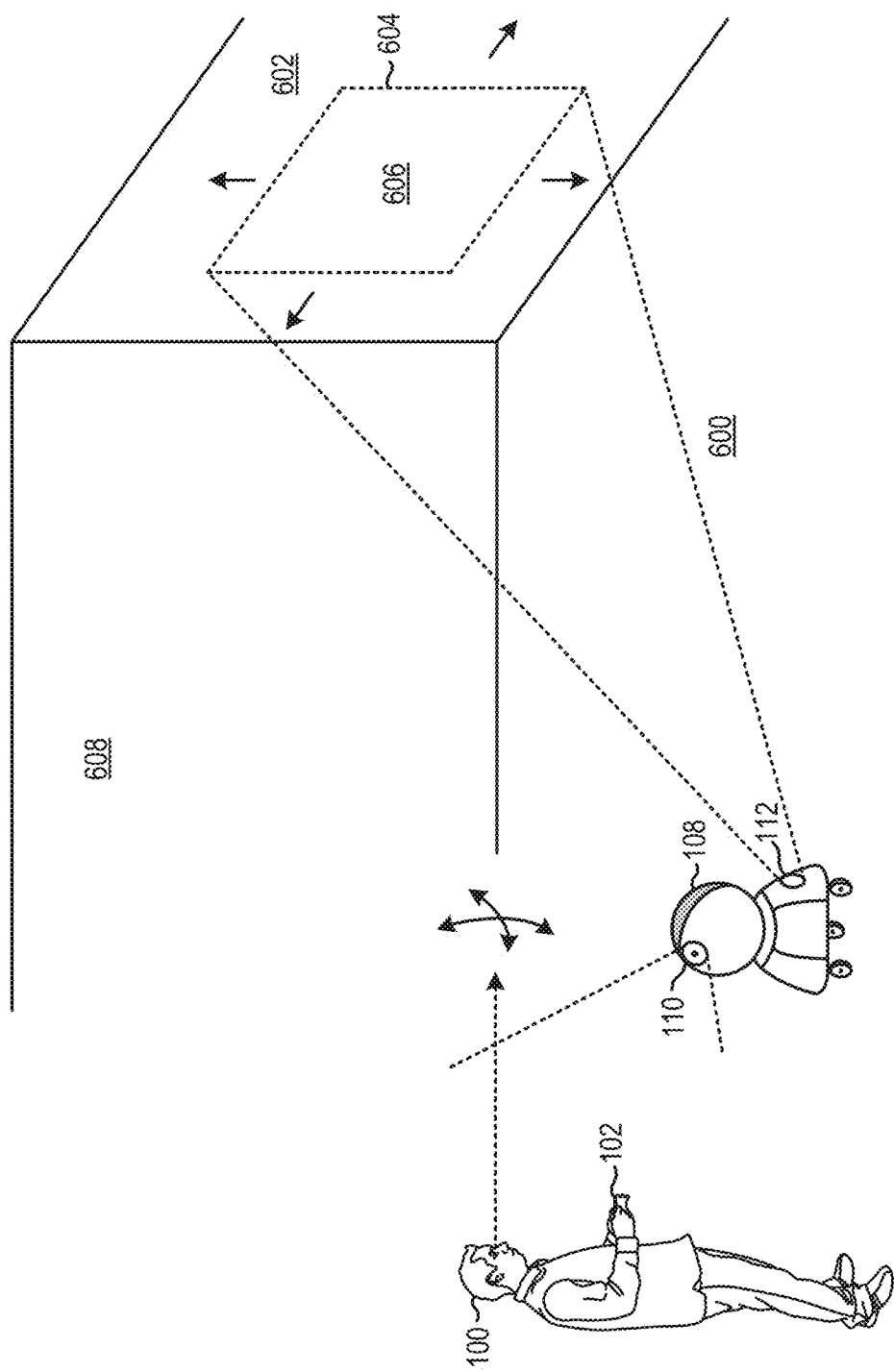
FIG. 6 illustrates projection of a view of a virtual space in an interactive environment, in accordance with implementations of the disclosure.

FIG. 6 illustrates projection of a view of a virtual space in an interactive environment, in accordance with implementations of the disclosure. As shown, the user 100 is situated in a local interactive environment 600, which may be a room or other interactive environment. A robot 108 is configured to use its camera 110 to determine and track the gaze direction of the user 100. The robot 108 is further configured to use its projector 112 to cast a projection 604 that shows a view 606 of a virtual space on the wall 602, which defines a projection surface for projection of images/video by the projector 112.

In the illustrated implementation, the projection 604 is movable by the robot 108 based on the gaze direction of the user 100. The projection 604 can be shifted along the wall 602 so as to track the user's gaze direction. In some implementations, the location of the projection 604 is adjusted so as to be approximately centered about the gaze direction of the user 100 (e.g. centered about the intersection of the user's gaze direction with the wall 602). In this manner, the projection 604 follows the gaze of the user 100.

Further, the direction of the view frustum in the virtual space that defines the view 606 of the virtual space can also be determined by the gaze direction of the user 100. In some implementations, the direction of the view frustum is adjusted in the virtual space in a substantially similar manner to changes in the gaze direction of the user 100 in the local environment 600. Thus, if the user 100 turns their head to the left, thereby rotating their gaze direction to the left in the local environment, then the direction of the view frustum in the virtual space is also rotated to the left by an equivalent or otherwise related amount, and the view 606 that is presented through the projection 604 is updated accordingly, thus changing the region of the virtual space that is viewable by the user 100 as the user's gaze direction changes and as the projection 604 itself is moved to be aligned in the path of the gaze direction of the user 100.

It will be appreciated that as the gaze direction of the user 100 changes, and the projection 604 is moved, the robot 108 itself may move to different locations to enable continued gaze tracking and proper projection, as has been discussed above. Further, the directions of the camera 110 and the projector 112 relative to each other may be adjusted depending on their configurations as defined by the robot 108. In some implementations, the robot 108 can be configured to move the projection 604 to other projection surfaces in the local environment 600 when the user's gaze direction moves to such positions, such as projecting on the adjacent wall 608.

Figure 7:
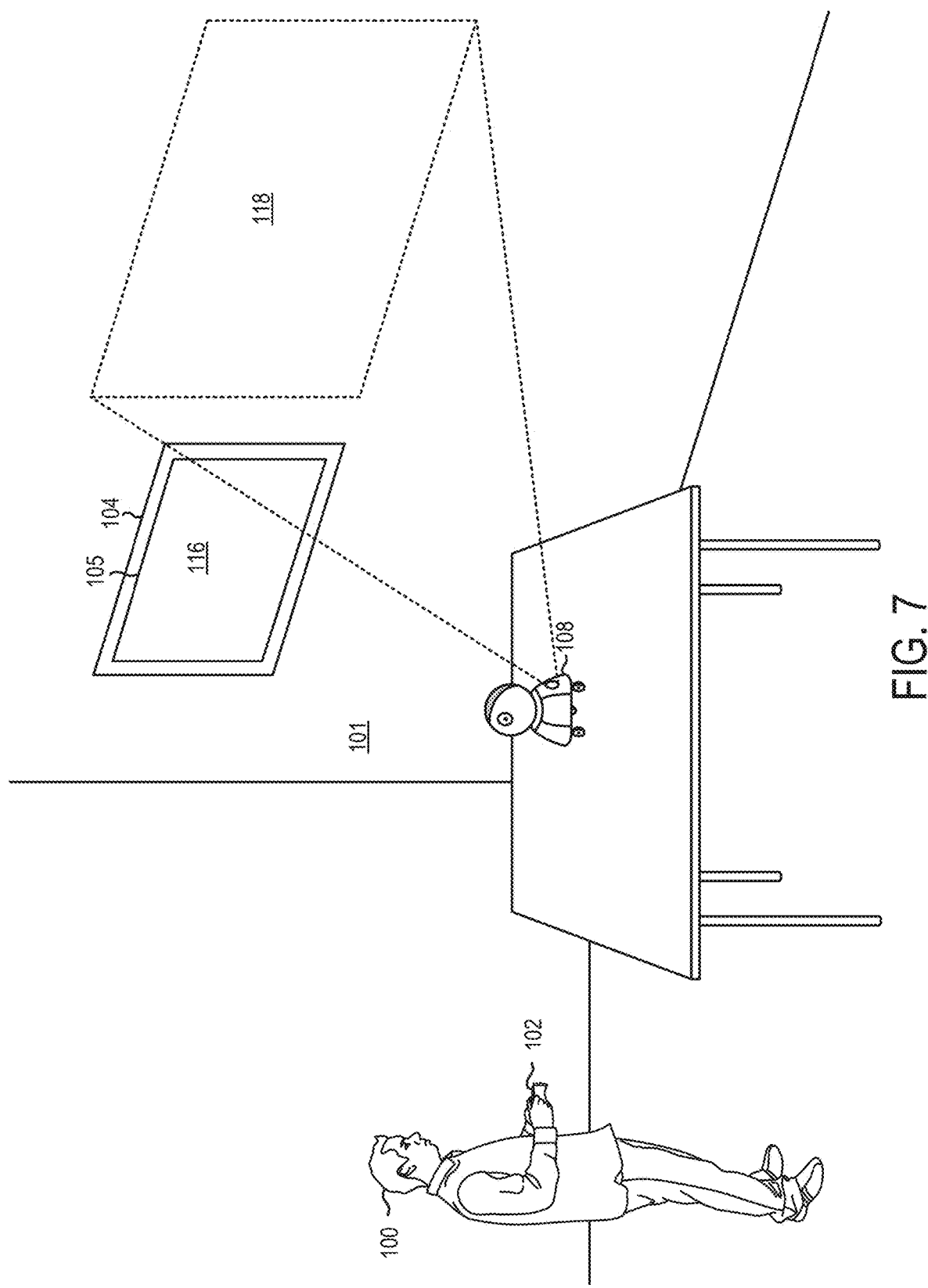
FIG. 7 illustrates a robot situated on top of a table in a local interactive environment, in accordance with implementations of the disclosure.

FIG. 7 illustrates a robot situated on top of a table in a local interactive environment, in accordance with implementations of the disclosure. As shown, the robot 108 is located on top of a table 700, which can be a coffee table, desk, dining table, or any other type of table or elevated platform in the local environment 101. By being elevated on the table 700, the robot 108 may have a better vantage point from which to capture images of the user 100, for example, for purposes of gaze tracking. The robot 108 may move about the top surface of the table 700, for example, to position itself better for tracking the user's gaze direction and/or projecting images/video onto a projection surface such as a wall or other surface in the local environment 101.

In some implementations, the robot 108 is configured to map the table 700, including the edges of the table, to determine the boundaries within which the robot 108 should be maintained so as not to fall off the table 700. In the illustrated implementation, a boundary 702 may be established based on such a mapping of table 700. Further, in some implementations, the robot 108 can include proximity sensors or other sensors that are configured and/or positioned to detect when the robot 108 is near a drop-off, such as may occur at the table's edge. The robot 108 can thus be mobile when situated on the table's surface, while configured to avoid falling off the table 700.

In the illustrated implementation, the robot 108 is shown projecting a secondary view 118 onto a projection surface (e.g. a region of a wall) that is adjacent to the display 104, on which the primary view 116 is rendered/displayed. In some implementations, the secondary view 118 as shown may be an extension of the primary view 116, enabling the user 100 to view a region of the virtual space that is adjacent to that shown by the primary view 116. It will be appreciated that the robot 108 can be configured to project other views onto other projection surfaces, as described elsewhere in the present disclosure.

Figure 8:
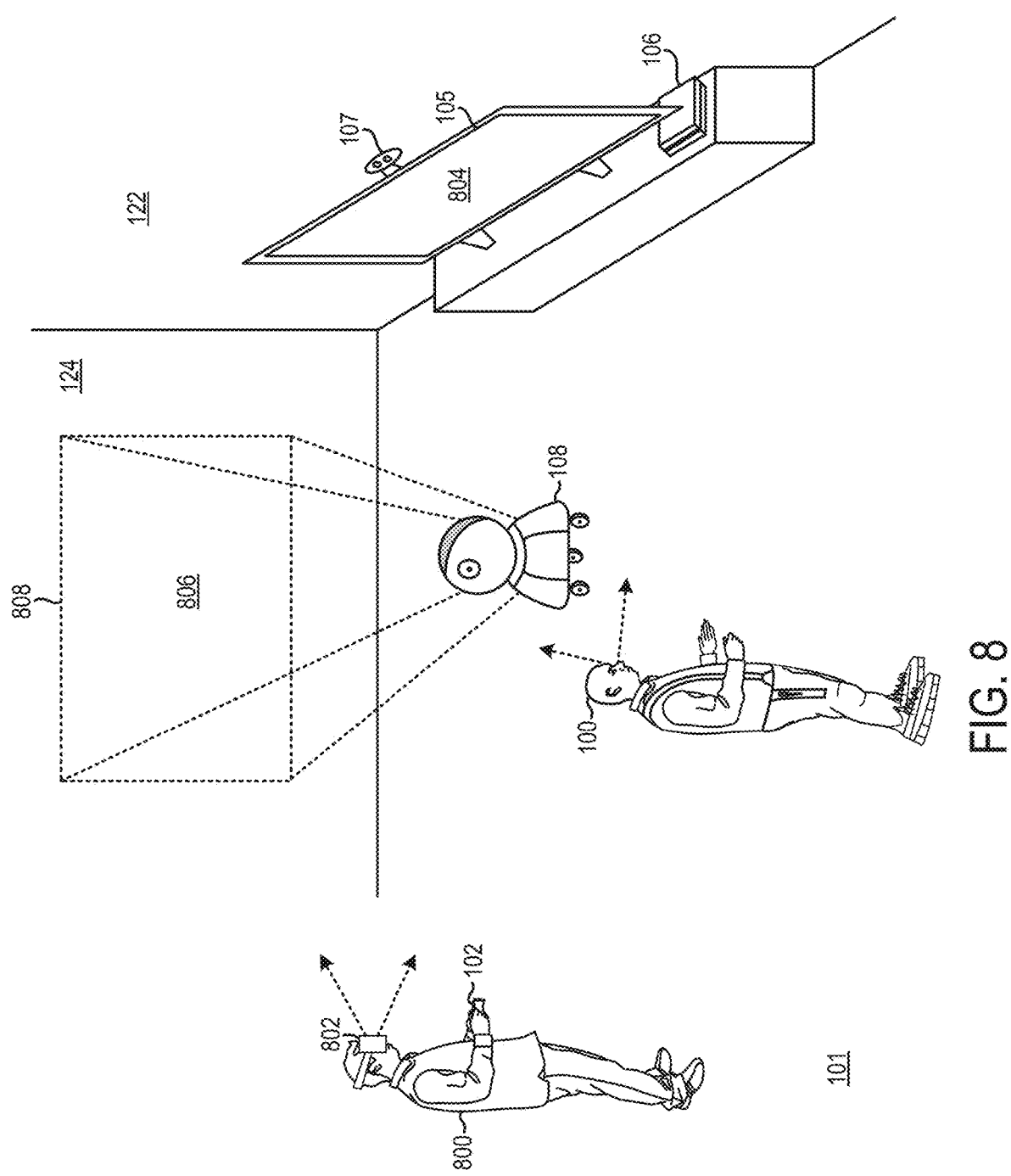
FIG. 8 illustrates a robot projecting a view of a virtual space that is also being viewed through a head-mounted display (HMD), in accordance with implementations of the disclosure.

FIG. 8 illustrates a robot projecting a view of a virtual space that is also being viewed through a head-mounted display (HMD), in accordance with implementations of the disclosure. In the illustrated implementation, a user 800 views a virtual space through a head-mounted display (HMD) 802 (also known as a virtual reality (VR) headset). By way of example without limitation, one example of an HMD is the PlayStation®VR headset. In some implementations, in order to allow spectators to see what the user 800 is seeing through the HMD 802, the view (or a portion thereof) that is rendered on the HMD 802 can also be rendered on the display device 104. Thus, the user 100 is able to spectate the user 800's view by viewing the display device 104. In some implementations, the robot 108 may project onto an available projection surface (e.g. a region of the wall 124 in the illustrated implementation) a secondary view 806 of the virtual space.

The spatial relationship of the secondary view 806 to the primary view 804 can be determined in accordance with methods previously described, including by way of example without limitation, based on a predefined spatial relationship in the virtual space, based on a viewpoint/view direction/ view frustum in the virtual space of the view provided through the HMD 802 (which may be defined from a character, vehicle, or other object in the virtual space), based on a physical spatial relationship between the projection surface on which the view 806 is projected and the display surface 105 of the display device 104, based on the location and gaze direction of the user 100 in the local environment and relative to the display 104 and the projection surface.

In some implementations, the view 804 shown on the display 104 is configured to show a view of the virtual space that is correlated to, or substantially or directionally similar in the virtual space to, the view (or a portion thereof) that is presented through the HMD 802 to the HMD user 800, when the HMD user 800 is facing substantially towards the display 104 (e.g. when the gaze direction of the user 800 is substantially directed towards the display 104). That is, the view direction in the virtual space for the view 804, is similar or the same as the view direction of the view rendered on the HMD when the user 800 faces towards the display 104. In this manner, the view rendered on the display 104 is anchored to the real-world orientation of the HMD 802 in an intuitive manner, such that when the user 800 faces towards the display 104, then the user 100 is able to see on the display a view similar to what the user 800 sees via the HMD 802.

In some implementations, then when the user 800 looks in a different direction, changing the orientation/location of the HMD 802, the robot 108 can be configured to project the view (or portion thereof) rendered on the HMD 802, in a spatially related fashion based on the changed direction that the user 800 is facing and/or the changed orientation/ location of the HMD 802. For example, in some implementations, the robot 108 is configured to project the view (or portion thereof) rendered on the HMD 802 on a surface that is substantially located where the direction the user 800 is facing (or where the user's 800 gaze direction) is directed towards, or substantially located where the HMD 802 is directed towards. Hence, as the HMD user 800 looks in various directions, the view of the virtual space that the HMD user 800 sees via the HMD 802, is shown or projected for the user 100 to see in a location that is aligned with the direction the HMD user 800 is facing.

It will be appreciated that in some implementations, the view of the virtual space provided to the HMD 802 may be generated by the computing device 106, and transmitted to the HMD 802. And further, the computing device 106 may generate the primary and secondary views 804 and 806.

While implementations have been described with reference to projection of a secondary view of a virtual space, in some implementations, the projection can be of other kinds of content. In some implementations, the robot can be configured to project static content related to the video game. For example, if the user is playing a level of a game that takes place in a particular type of environment (e.g. jungle, ocean, desert, city, mountains, forest, space, sports, etc.), then the robot may project images/video that relate to the particular type of environment (e.g. a jungle scene is projected when the gameplay takes place in a jungle, an audience or crowd is projected when the gameplay occurs in an arena, etc.). Furthermore, in some implementations, the robot can project other game-related content, including, by way of example without limitation, player inventory, game menus, maps, messages, status information, game advertising, etc.

Figure 9:
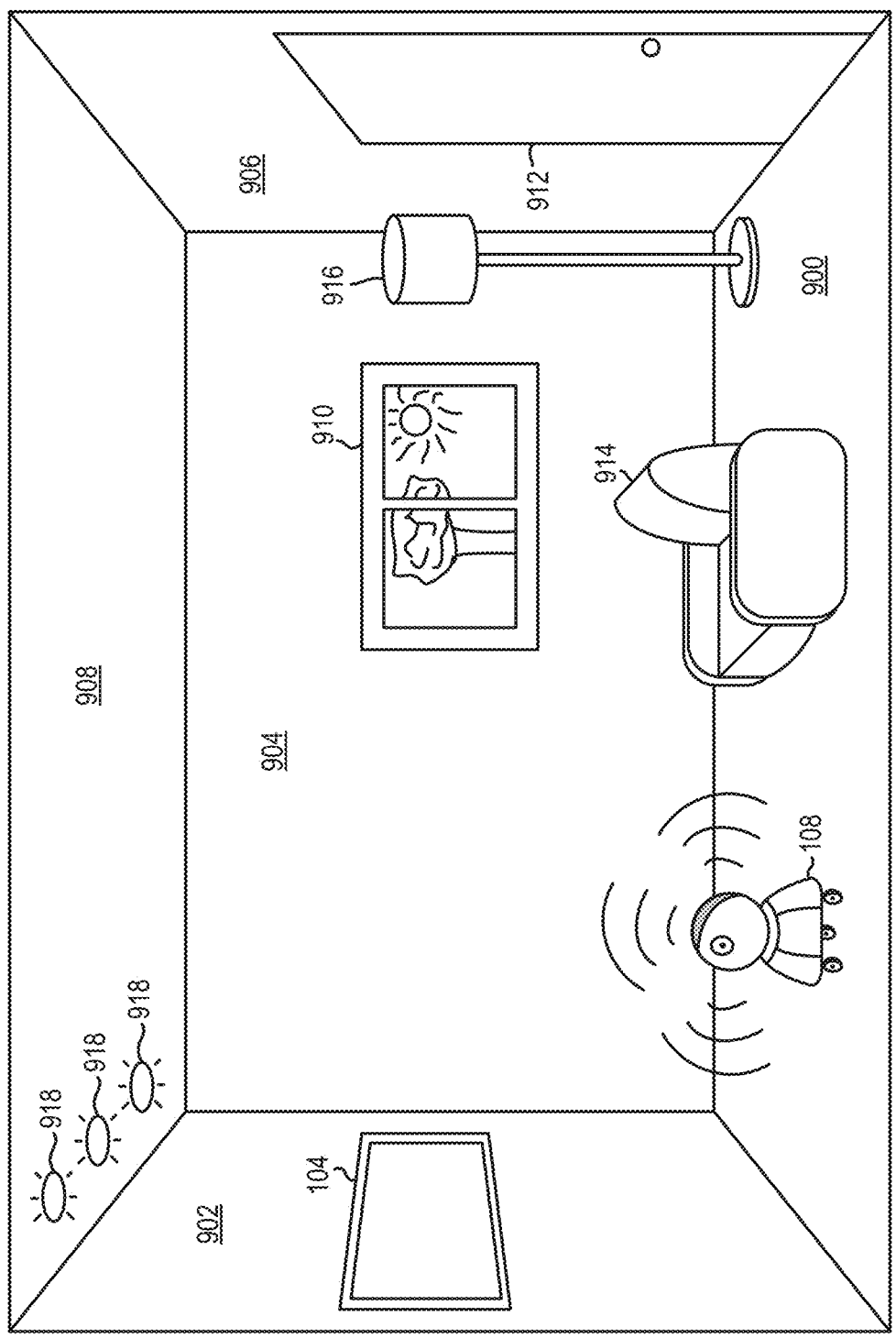
FIG. 9 illustrates a robot situated in a local environment having various features, in accordance with implementations of the disclosure.

FIG. 9 illustrates a robot situated in a local environment having various features, in accordance with implementations of the disclosure. In the illustrated implementation, the local environment 900 is defined by a room having walls 902, 904, and 906, and a ceiling 908. The display device 104 is mounted along the wall 902, a window 910 is defined in the wall 904, and a door 912 is defined in the wall 906. A couch 914 and a lamp 916 are situated in the room. Lights 918 are located along the ceiling 908.

The robot 108 is configured to scan the local environment 900 to identify surfaces that are suitable for projection of images/video, including projection of views of a virtual space as have been described. The robot 108 may use any of various types of sensors and techniques as are known in the art to map the local environment, including mapping the locations and shapes of objects, as well as their texture and color, in order to determine their suitability as projection surfaces. By way of example without limitation, the robot 108 can use sensors such as a camera/image capture device, proximity sensor (e.g. infrared, ultrasonic, photoresistor, etc.), depth camera, range sensor (e.g. stereo camera, infrared, ultrasonic, laser, etc.), inertial sensors (e.g. accelerometer, gyroscope, magnetometer), global positioning system (GPS), etc. Further, by way of example without limitation, the robot 108 can use techniques such as simultaneous localization and mapping (SLAM) techniques to map the local environment. Object recognition techniques can be applied by the robot 108 to identify objects in the local environment, including analyzing captured images of the local environment.

With continued reference to FIG. 9, the robot 108 may identify and recognize the objects in the room, such as the various walls and ceiling, the display device 104, the window 910, the door 912, the couch 914, and the lamp 916. The robot 108 may map the locations and orientations of such objects, and identify surfaces that are capable of being used for projection thereon. For example, the robot may determine that the regions of the wall 902 excluding the display 104 can be used for projection; the regions of the wall 904 excluding the window 910 and not occluded by the lamp 916 can be used for projection; the regions of the wall 906 excluding the door 912 and not occluded by the lamp 916 can be used for projection; the regions of the ceiling 908 excluding the lights 918 can be used for projection.

The robot 108 may utilize the mapping of the objects as well as real-time sensing of the local environment through its various sensor hardware, to facilitate movement by the robot, for example to enable gaze tracking and/or projection of video, while avoiding collisions with other objects in the local environment.

In some implementations, the robot 108 is configured to determine the size of the display device 104, and adjust parameters for projection based on the size of the display device 104. For example, the size of the projected images/video from the robot 108 can be configured to be approximately the same as the display device 104, such as by adjusting zoom settings of the projector 112 or the location of the robot 108 when projecting on a surface. In some implementations, the size of the view (or the corresponding view frustum) projected by the projector 112 of the robot 108 is adjusted to provide consistent dimensional sizing when viewing the virtual space on the display device 104 versus viewing a projected view from the robot 108. In other words, whether displayed through the display 104 or through projection by the robot 108, the sizing of the view of the virtual space will be consistent.

Figure 10:
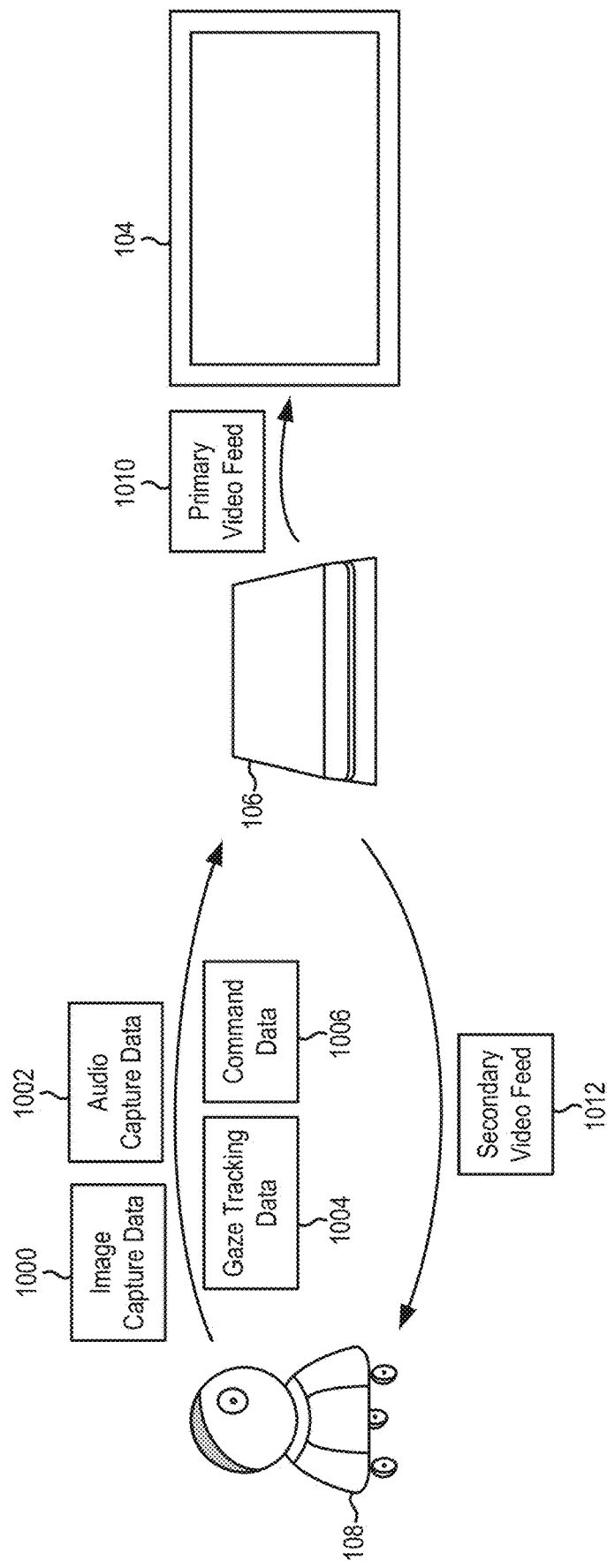
FIG. 10 illustrates a system for projecting a secondary view of a virtual space from a robot, in accordance with implementations of the disclosure.

FIG. 10 illustrates a system for projecting a secondary view of a virtual space from a robot, in accordance with implementations of the disclosure. In some implementations, the robot 108 uses its camera 110 to capture images of the local environment, which are processed into image capture data 1000, and transmitted to the computing device 106. The image capture data 1000 can be defined by a stream of image frames in some implementations. The computing device 106 executes an interactive application (e.g. a video game in some implementations) that defines a virtual space. The computing device 106 generates a primary video feed 1010 that is transmitted to a display 104 and rendered on the display 104, thereby displaying a primary view of the virtual space through the display 104.

The computing device 106 may further analyze the received image capture data 1000 to determine the gaze direction of a user. This may entail analysis of the received image capture data 1000 to identify, model, and track various portions of the user, as described above, such as the user's head, eyes, body, legs, etc. Based on tracking the gaze direction of the user, the computing device 106 may determine when the user turns to view a projection surface. And when this occurs, the computing device 106 generates a secondary video feed 1012 that depicts a secondary view of the virtual space, and transmits the secondary video feed 1012 to the robot 108. The robot 108 projects the secondary video feed 1012 onto the projection surface, thereby displaying the secondary view of the virtual space.

In some implementations, the primary video feed and secondary video feed are generated in the alternative, such that when one is being streamed, the other is not. However, in other implementations, both the primary video feed and the secondary video feed can be simultaneously generated, and both can be streamed, and rendered simultaneously by the display 104 and the robot 108, respectively.

In some implementations, the image capture data 1000 may further be analyzed by the computing device to determine other aspects of the user or local environment which may be utilized by the interactive application, including by way of example without limitation, gestures or movements by the user, facial expressions, identification of objects in the local environment, etc.

Additionally, the robot 108 may have a microphone to capture audio from the local environment, such as spoken word/sounds by the user. The captured audio is processed into audio capture data 1002 that is transmitted to the computing device 106. The audio capture data 1002 can be processed by the computing device 106 to, by way of example without limitation, identify voice commands or other verbal interactive content which may affect the interactive application.

While implementations have been described wherein the computing device processes/analyzes the image capture data 1000 and/or audio capture data 1002, in other implementations, such analysis can be carried out in part or in whole by the robot 108. For example, in some implementations, the robot 108 can be configured to analyze the captured image data to determine the gaze direction of the user, which may be encoded as gaze tracking data 1004 that is transmitted to the computing device 108. In some implementations, the robot 108 can be configured to analyze the captured audio data to determine voice commands or other verbal content by the user, which may be encoded as command data 1006 that is transmitted to the computing device 108.

In another implementation, the robot 108 acts as a remote client to the interactive application, and is configured to generate the secondary video feed (e.g. perform the graphical rendering of the secondary view of the virtual space). This reduces the processing load on the computing device 106, and may enable higher fidelity video rendering for the secondary view than would otherwise be possible.

Figure 11:
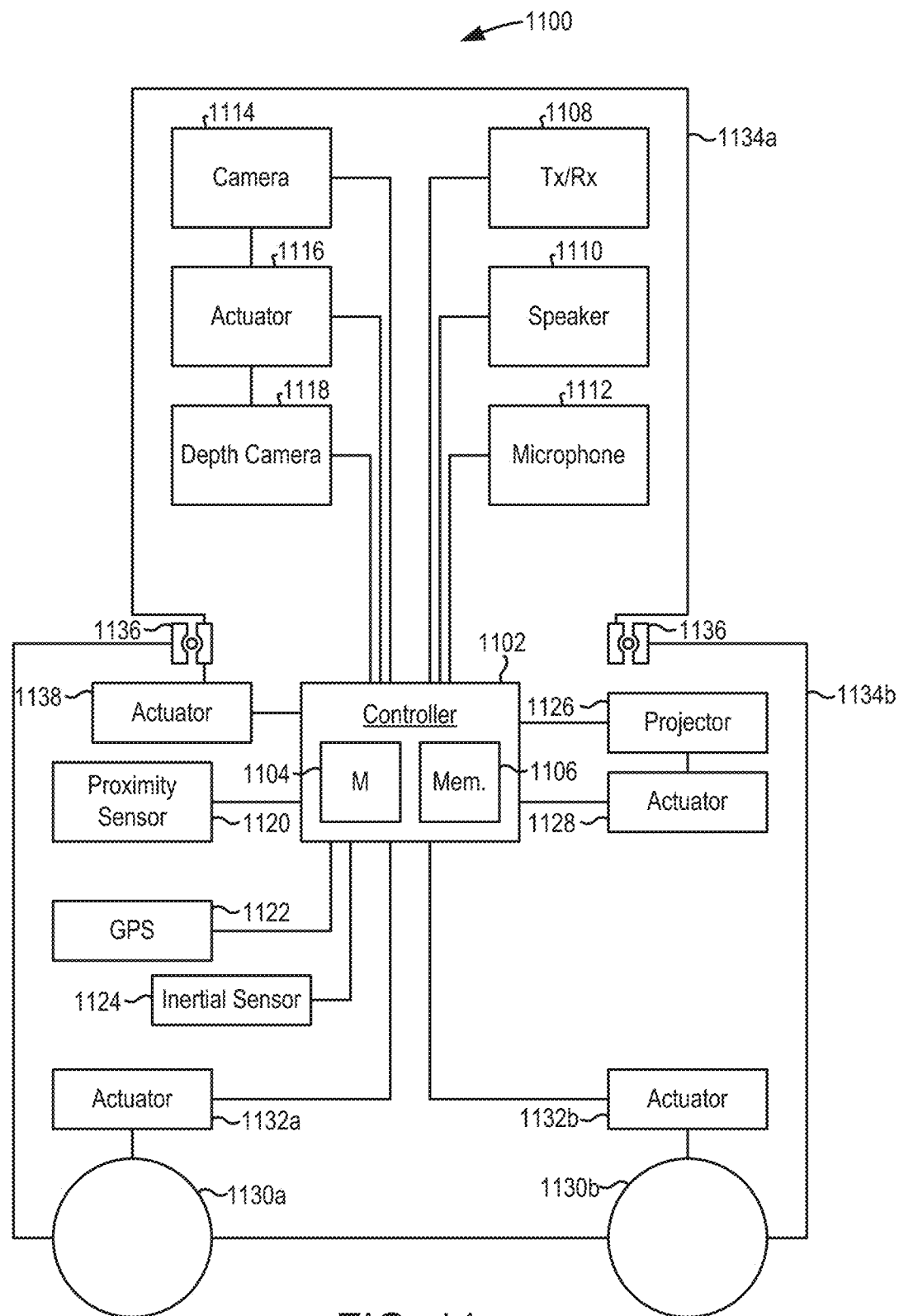
FIG. 11 is a schematic diagram conceptually illustrating components of a robot, in accordance with implementations of the disclosure.

FIG. 11 is a schematic diagram conceptually illustrating components of a robot, in accordance with implementations of the disclosure. As shown, the robot 1100 includes a controller 1102 that is configured to control various devices of the robot and the operations performed by the robot 1100, including processing data and instructions, and issuing commands to various devices of the robot 1100 to cause the robot to move, capture images/audio/video, render images/audio/video, or perform any other function of which the robot is capable, as described in the present disclosure. The controller 1102 includes one or more processors 1104 (e.g. microprocessor, general purpose processor (GPP), application specific processor (ASP), central processing unit (CPU), graphics processing unit (GPU), complex instruction set computer (CISC), reduced instruction set computer (RISC), application specific integrated circuit (ASIC), digital signal processor (DSP), etc.) configured to execute program instructions, and one or more memory devices 1106 (e.g. volatile memory, non-volatile memory, random access memory (RAM), read-only memory (ROM), SRAM, DRAM, flash memory, magnetic memory, hard disk, optical disc, etc.) configured to store and retrieve data.

A transceiver 1108 is configured to transmit and/or receive data, via a wireless or wired connection. The transceiver 1108 may communicate over one or more networks and use any of various data communications protocols known in the art, including by way of example without limitation, IP-based protocols, Wi-Fi, Bluetooth, NFC, Zigbee, Z-Wave, ANT, UWB, Wireless USB, Sigfox, cellular networks (2G/3G/4G/5G networks, LTE networks, etc.), infrared protocols (e.g. IRDA protocols), etc.

The robot 1100 includes one or more speakers 1110 that are capable of emitting any kind of audio, including by way of example without limitation, sounds from a virtual environment being rendered by the robot 1100, music, speech, audio from a media presentation (e.g. television program, movie, show, etc.), etc.

The robot 1100 includes one or more microphones 1112, that are configured to capture sound from the local environment in which the robot is disposed. A plurality of microphones may permit greater sensitivity in a greater number of directions simultaneously. In some implementations, the microphones 1112 are configured in an array or other predefined positioning arrangement, so that signals from the microphone array can be analyzed to determine directionality of audio sources relative to the microphone array.

The robot 1100 includes one or more image capture devices/cameras 1114 configured to capture images/video from the local environment. Multiple image capture devices can be employed to enable simultaneous coverage of a larger region or multiple regions of the local environment and/or improved environment mapping, depth analysis, by way of example without limitation.

The one or more cameras 1114 can be directed by one or more actuators 1116, to enable the direction of a given camera to be adjusted. Actuators 1116 can be configured to rotate, translate, raise, lower, tilt, pan, or otherwise move or change the orientation of the cameras 1114.

The robot 1100 includes one or more depth cameras 1118. A depth camera is capable of capturing depth/ranging information about objects in the local environment. In some implementations, the depth camera 1118 is a time-of-flight camera that determines distance based on the time-of-flight of a controlled light signal to various points in the local environment.

Similar to the cameras 1114, the depth cameras 1118 can be directed by one or more actuators 1116, which may be the same or different actuators as those that direct the one or more cameras 1114.

The robot 1100 includes one or more proximity sensors 1120, that are capable of detecting proximity of the robot to nearby objects. The proximity sensors 1120 can be mounted at various locations on the robot 1100, to enable proximity detection for corresponding portions of the robot 1100. For example, in some implementations, at least one proximity sensor is mounted at a lower portion of the robot 1100 to enable proximity detection in this vicinity, such as to provide detection of objects nearby to the lower portion of the robot (e.g. objects on the floor/surface on which the robot 1100 is situated). In some implementations, one or more proximity sensors are mounted along other portions of the robot 1100, including middle and upper portions of the robot. Proximity sensors 1120 can be useful for avoiding collisions of the robot 1100 with objects in the local environment, detecting the presence of nearby objects, detecting gestures by a user in the vicinity of the robot, etc.

The robot 1100 includes a global positioning system (GPS) device/receiver 1122, that is configured to receive information from GPS satellites for determining the geolocation of the robot 1100.

The robot 1124 includes one or more inertial/motion sensors 1124 that are capable of detecting movement and/or orientation of the robot 1124. Examples of inertial/motion sensors include accelerometers, magnetometers, gyroscopes, etc.

The robot 1124 includes at least one projector 1126 that is capable of projecting images/video onto surfaces in the local environment. By way of example without limitation, the projector can be an LCD projector, LED projector, DLP projector, LCoS projector, pico projector, etc.

The robot 1100 includes a plurality of wheels/rollers, e.g. wheels/rollers 1130a and 1130b as shown, that are configured to enable the robot 1100 to move about the local environment. One or more of the wheels/rollers can be controlled by actuators (e.g. actuators 1132a and 1132b) to cause the wheels/rollers to rotate and thereby effect movement of the robot 1100. In some implementations, wheels/rollers can be multi-directional or omnidirectional, that is, capable of producing or facilitating movement in more than one direction or all directions.

The various components of the robot 1100 can be contained within a housing. In the illustrated implementation, an upper housing 1134a and a lower housing 1134b are included. The upper housing 1134a is configured to be rotatable relative to the lower housing 1134b, facilitated by a plurality of bearings 1136. In some implementations, an actuator 1138 is configured to rotate the upper housing 1134a. In various implementations, any of the various components of the robot 1100 can be mounted to or within the upper housing 1134a, and configured to be rotated/moved when the upper housing 1134a is rotated, while others of the various components are mounted to or within the lower housing 1134b and not simultaneously rotated.

By way of example, in some implementations, the camera 1114, depth camera 1118, speaker 1110, and/or microphone 1112 is/are mounted to the upper housing 1134a, while the projector 1126 is mounted to the lower housing 1134b. The components mounted to the upper housing 1134a can be rotated with the upper housing 1134a, independent of the projector 1126. This can enable the robot 1100 to direct the projector 1126 independently of the camera 1114, depth camera 1118, speaker 1110, and/or microphone 1112. For example, this may be useful to allow the camera 1114, depth camera 1118, speaker 1110, and/or microphone 1112 to be directed towards a user, while the projector 1126 is directed towards a wall or other projection surface.

FIGS. 12A-12G illustrate various types of robots, in accordance with implementations of the disclosure.

Figure 12A:
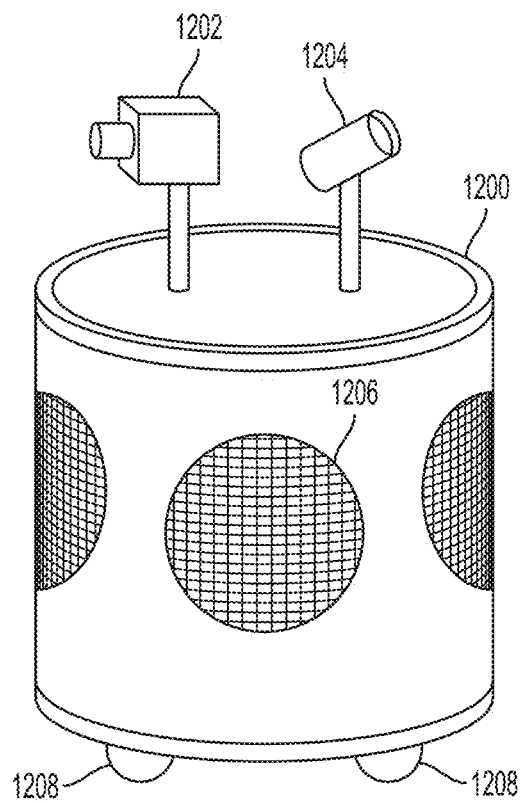

FIG. 12A illustrates a robot having a cylindrical shaped body 1200, in accordance with implementations of the disclosure. A projector 1202 and a camera 1204 are mounted to respective poles that are extendable and/or rotatable in accordance with implementations of the disclosure. The robot may include a plurality of speakers 1206 that enable the robot to emit audio in multiple directions. Though not specifically shown, the robot may also include a down-firing speaker. The robot further includes wheels 1208 for propulsion/movement of the robot about the local environment.

Figure 12B:
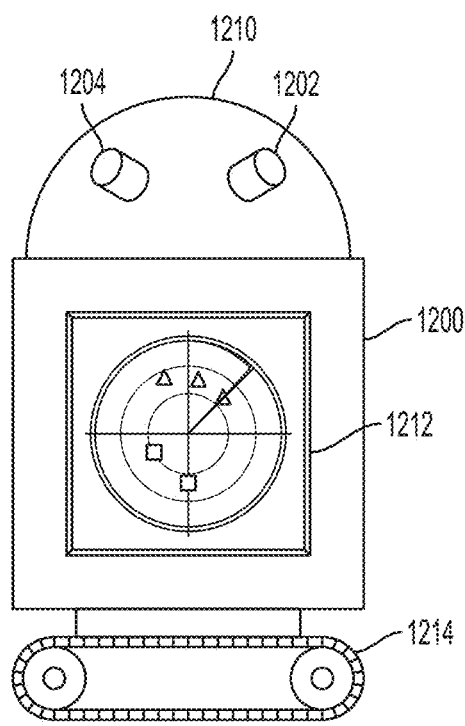

FIG. 12B illustrates a robot having an upper rotatable portion 1210, to which components such as the projector 1202 and camera 1204 may be mounted, in accordance with implementations of the disclosure. The robot further includes a display 1212, which can be configured to render any kind of data. In some implementations, the display 1212 of the robot can be used as a secondary display to show information useful to a player during a video game. The display 1212 can be touchscreen display, and capable of receiving input from a user via touches and gestures on the touchscreen display. The robot further employs a continuous track system 1214 (also known as a tank tread or caterpillar tread) for propulsion of the robot.

Figure 12C:
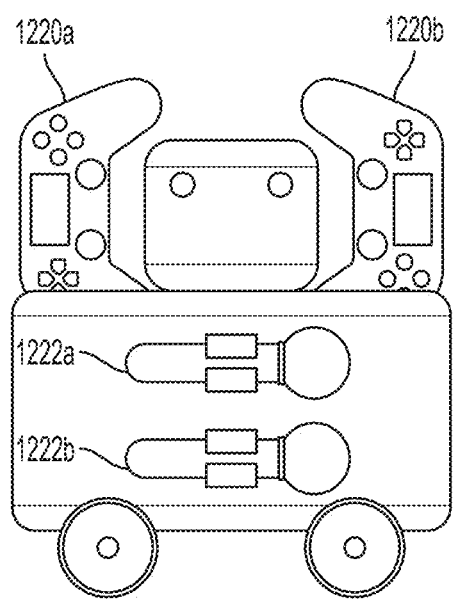

FIG. 12C illustrates a robot configured to also function as a storage location for controllers and/or other interface devices, in accordance with implementations of the disclosure. In the illustrated implementation, the robot is configured to hold/store controllers 1220a and 1220b, and motion controllers 1222a and 1222b. The robot can include any of various kinds of devices for holding a controller or other interface device, such as a clasp, clip, strap, clamp, pocket, hole, recess, etc.

Figure 12D:
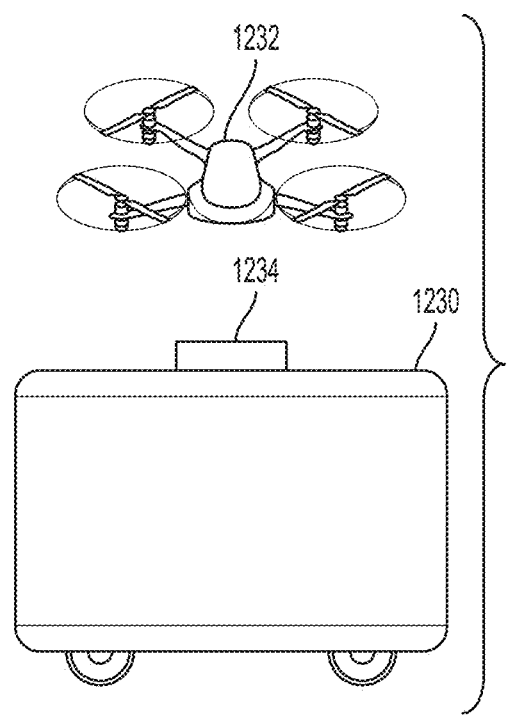

FIG. 12D illustrates a robot having a main body 1230 and a launchable drone 1232, in accordance with implementations of the disclosure. When not in flight, the drone 1232 may rest on, and/or be secured to, a support structure 1234 on the main body 1230. The support structure 1234 may include contacts configured to mate with corresponding contacts on the drone 1232, to enable communication of data between the drone 1232 and the main body 1230 of the robot, as well as charging of the drone's battery. It will be appreciated that the drone 1232 may include various components useful for its operation and/or that may be used while the drone is in flight, such as a camera, depth camera, microphone, projector, inertial/motion sensors, wireless transceiver, etc. The drone 1232 may communicate wirelessly with the main body 1230 and be controlled via wireless signals sent from the main body 1230. The drone 1232 can be activated and flown so as to provide elevated vantage points for image capture, audio capture, projection, audio rendering, etc.

FIG. 12E illustrates a robot having the form-factor of a humanoid device, in accordance with implementations of the disclosure. The robot includes a head 1240 that can be articulated, and may include devices such as a camera, projector, etc. The robot further includes arms 1242, which can be articulated, and configured to clasp items, perform gestures, etc. The robot further includes legs 1244, which can be articulated, and configured to enable the robot to walk/run or otherwise move about the local environment.

FIG. 12F illustrates a robot having a rotatable ball-shaped portion 1250, in accordance with implementations of the disclosure. In some implementations, the ball-shaped portion 1250 can be rotated omnidirectionally, so as to redirect any device mounted thereto, such as a camera, projector, microphone, etc. The ball-shaped portion 1250 is supported by a mid-portion 1252, that is rotatable about a base portion 1254, thereby providing greater flexibility of movement of the devices of the robot.

FIG. 12G illustrates a robot having a body 1260 defined between wheels 1262, in accordance with implementations of the disclosure. In some implementations, the wheels 1262a and 1626b are oversized so as to be substantially larger than the body 1260, to enable the robot to traverse obstacles or other discontinuities. In some implementations, the center of gravity of the body 1260 is configured to be below the level of the axis of the wheels 1262a and 1262b, so that the orientation of the body 1260 is easily maintained while having only two wheels for support.

Figure 13:
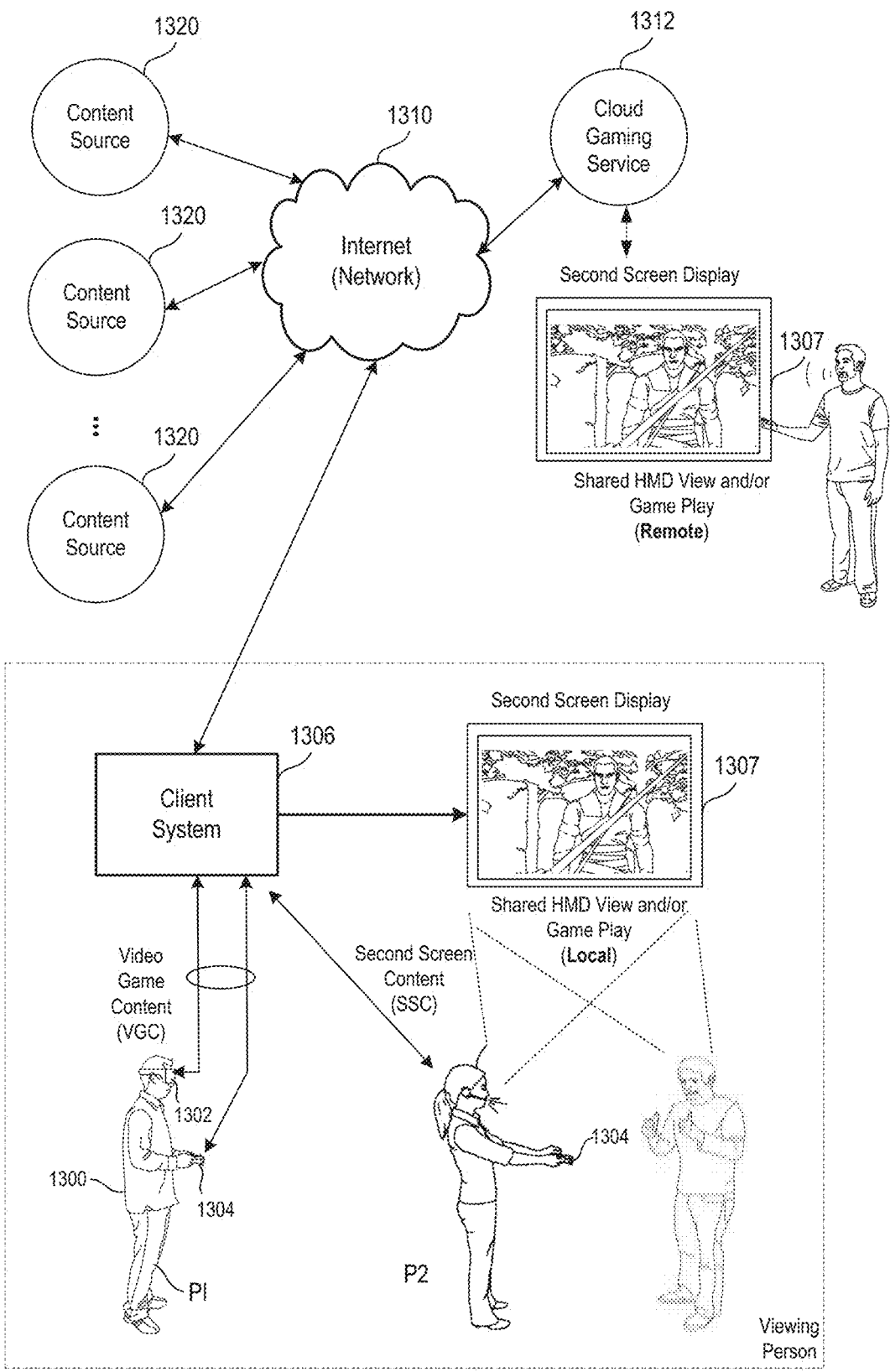
FIG. 13 illustrates one example of a user interfacing with a client system, and the client system providing content to a second screen display, which is referred to as a second screen, in accordance with one embodiment.

FIG. 13 illustrates one example of an HMD 102 user 1300 interfacing with a client system 1306, and the client system 1306 providing content to a second screen display, which is referred to as a second screen 1307. The client system 1306 may include integrated electronics for processing the sharing of content from the HMD 1302 to the second screen 1307. Other embodiments may include a separate device, module, connector, that will interface between the client system and each of the HMD 1302 and the second screen 1307. In this general example, user 1300 is wearing HMD 1302 and is playing a video game using a controller, which may also be directional interface object 1304. The interactive play by user 1300 will produce video game content (VGC), which is displayed interactively to the HMD 1302.

In one embodiment, the content being displayed in the HMD 1302 is shared to the second screen 1307. In one example, a person viewing the second screen 1307 can view the content being played interactively in the HMD 1302 by user 1300. In another embodiment, another user (e.g. player 2) can interact with the client system 1306 to produce second screen content (SSC). The second screen content produced by a player also interacting with the controller 1304 (or any type of user interface, gesture, voice, or input), may be produced as SSC to the client system 1306, which can be displayed on second screen 1307 along with the VGC received from the HMD 1302.

Accordingly, the interactivity by other users who may be co-located or remote from an HMD user can be social, interactive, and more immersive to both the HMD user and users that may be viewing the content played by the HMD user on a second screen 1307. As illustrated, the client system 1306 can be connected to the Internet 1310. The Internet can also provide access to the client system 1306 to content from various content sources 1320. The content sources 1320 can include any type of content that is accessible over the Internet.

Such content, without limitation, can include video content, movie content, streaming content, social media content, news content, friend content, advertisement content, etc. In one embodiment, the client system 1306 can be used to simultaneously process content for an HMD user, such that the HMD is provided with multimedia content associated with the interactivity during gameplay. The client system 106 can then also provide other content, which may be unrelated to the video game content to the second screen. The client system 1306 can, in one embodiment receive the second screen content from one of the content sources 1320, or from a local user, or a remote user.

Figure 14:
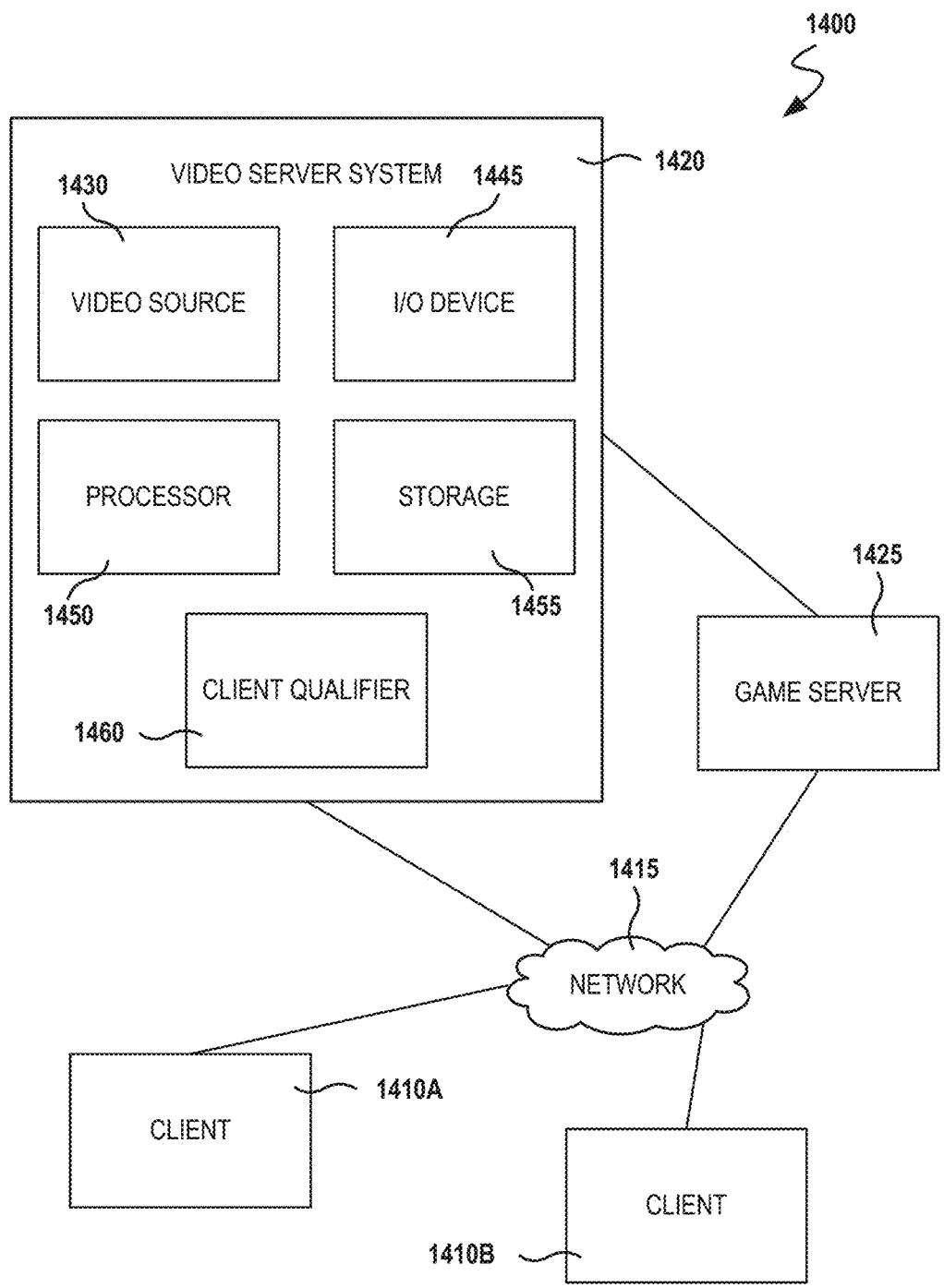
FIG. 14 is a block diagram of a Game System 1400, according to various embodiments of the disclosure.

FIG. 14 is a block diagram of a Game System 1400, according to various embodiments of the disclosure. Game System 1400 is configured to provide a video stream to one or more Clients 1410 via a Network 1415. Game System 1400 typically includes a Video Server System 1420 and an optional game server 1425. Video Server System 1420 is configured to provide the video stream to the one or more Clients 1410 with a minimal quality of service. For example, Video Server System 1420 may receive a game command that changes the state of or a point of view within a video game, and provide Clients 1410 with an updated video stream reflecting this change in state with minimal lag time. The Video Server System 1420 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative embodiments of the disclosure.

Clients 1410, referred to herein individually as 1410A, 1410B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1410 are configured to receive encoded video streams, decode the video streams, and present the resulting video to a user, e.g., a player of a game. The processes of receiving encoded video streams and/or decoding the video streams typically includes storing individual video frames in a receive buffer of the Client. The video streams may be presented to the user on a display integral to Client 1410 or on a separate device such as a monitor or television. Clients 1410 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1410 are optionally geographically dispersed. The number of clients included in Game System 1400 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1420 to deliver a game viewed through the HMD. In one embodiment, the game console receives the video stream from the video server system 1420, and the game console forwards the video stream, or updates to the video stream, to the HMD for rendering.

Clients 1410 are configured to receive video streams via Network 1415. Network 1415 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1410 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1410 may, but are not required to, further include systems configured for modifying received video. For example, a Client may be configured to perform further rendering, to overlay one video image on another video image, to crop a video image, and/or the like. For example, Clients 1410 may be configured to receive various types of video frames, such as I-frames, P-frames and B-frames, and to process these frames into images for display to a user. In some embodiments, a member of Clients 1410 is configured to perform further rendering, shading, conversion to 3-D, or like operations on the video stream. A member of Clients 1410 is optionally configured to receive more than one audio or video stream. Input devices of Clients 1410 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1410 is generated and provided by Video Server System 1420. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1410 are typically configured to receive inputs from a user. These inputs may include game commands configured to change the state of the video game or otherwise affect game play. The game commands can be received using input devices and/or may be automatically generated by computing instructions executing on Clients 1410. The received game commands are communicated from Clients 1410 via Network 1415 to Video Server System 1420 and/or Game Server 1425. For example, in some embodiments, the game commands are communicated to Game Server 1425 via Video Server System 1420. In some embodiments, separate copies of the game commands are communicated from Clients 1410 to Game Server 1425 and Video Server System 1420. The communication of game commands is optionally dependent on the identity of the command. Game commands are optionally communicated from Client 1410A through a different route or communication channel that that used to provide audio or video streams to Client 1410A.

Game Server 1425 is optionally operated by a different entity than Video Server System 1420. For example, Game Server 1425 may be operated by the publisher of a multiplayer game. In this example, Video Server System 1420 is optionally viewed as a client by Game Server 1425 and optionally configured to appear from the point of view of Game Server 1425 to be a prior art client executing a prior art game engine. Communication between Video Server System 1420 and Game Server 1425 optionally occurs via Network 1415. As such, Game Server 1425 can be a prior art multiplayer game server that sends game state information to multiple clients, one of which is game server system 1420. Video Server System 1420 may be configured to communicate with multiple instances of Game Server 1425 at the same time. For example, Video Server System 1420 can be configured to provide a plurality of different video games to different users. Each of these different video games may be supported by a different Game Server 1425 and/or published by different entities. In some embodiments, several geographically distributed instances of Video Server System 1420 are configured to provide game video to a plurality of different users. Each of these instances of Video Server System 1420 may be in communication with the same instance of Game Server 1425. Communication between Video Server System 1420 and one or more Game Server 1425 optionally occurs via a dedicated communication channel. For example, Video Server System 1420 may be connected to Game Server 1425 via a high bandwidth channel that is dedicated to communication between these two systems.

Video Server System 1420 comprises at least a Video Source 1430, an I/O Device 1445, a Processor 1450, and non-transitory Storage 1455. Video Server System 1420 may include one computing device or be distributed among a plurality of computing devices. These computing devices are optionally connected via a communications system such as a local area network.

Video Source 1430 is configured to provide a video stream, e.g., streaming video or a series of video frames that form a moving picture. In some embodiments, Video Source 1430 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1425. Game Server 1425 may maintain a copy of the state of the game based on game commands received from multiple players using geographically disperse clients. In these cases, the game state is provided by Game Server 1425 to Video Source 1430, wherein a copy of the game state is stored and rendering is performed. Game Server 1425 may receive game commands directly from Clients 1410 via Network 1415, and/or may receive game commands via Video Server System 1420.

Video Source 1430 typically includes rendering logic, e.g., hardware, firmware, and/or software stored on a computer readable medium such as Storage 1455. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1410. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1430 includes a video recording device such as a camera. This camera may be used to generate delayed or live video that can be included in the video stream of a computer game. The resulting video stream optionally includes both rendered images and images recorded using a still or video camera. Video Source 1430 may also include storage devices configured to store previously recorded video to be included in a video stream. Video Source 1430 may also include motion or positioning sensing devices configured to detect motion or position of an object, e.g., person, and logic configured to determine a game state or produce video-based on the detected motion and/or position.

Video Source 1430 is optionally configured to provide overlays configured to be placed on other video. For example, these overlays may include a command interface, log in instructions, messages to a game player, images of other game players, video feeds of other game players (e.g., webcam video). In embodiments of Client 1410A including a touch screen interface or a gaze detection interface, the overlay may include a virtual keyboard, joystick, touch pad, and/or the like. In one example of an overlay a player's voice is overlaid on an audio stream. Video Source 1430 optionally further includes one or more audio sources.

In embodiments wherein Video Server System 1420 is configured to maintain the game state based on input from more than one player, each player may have a different point of view comprising a position and direction of view. Video Source 1430 is optionally configured to provide a separate video stream for each player based on their point of view. Further, Video Source 1430 may be configured to provide a different frame size, frame data size, and/or encoding to each of Client 1410. Video Source 1430 is optionally configured to provide 3-D video.

I/O Device 1445 is configured for Video Server System 1420 to send and/or receive information such as video, commands, requests for information, a game state, gaze information, device motion, device location, user motion, client identities, player identities, game commands, security information, audio, and/or the like. I/O Device 1445 typically includes communication hardware such as a network card or modem. I/O Device 1445 is configured to communicate with Game Server 1425, Network 1415, and/or Clients 1410.

Processor 1450 is configured to execute logic, e.g. software, included within the various components of Video Server System 1420 discussed herein. For example, Processor 1450 may be programmed with software instructions in order to perform the functions of Video Source 1430, Game Server 1425, and/or a Client Qualifier 1460. Video Server System 1420 optionally includes more than one instance of Processor 1450. Processor 1450 may also be programmed with software instructions in order to execute commands received by Video Server System 1420, or to coordinate the operation of the various elements of Game System 1400 discussed herein. Processor 1450 may include one or more hardware device. Processor 1450 is an electronic processor.

Storage 1455 includes non-transitory analog and/or digital storage devices. For example, Storage 1455 may include an analog storage device configured to store video frames. Storage 1455 may include a computer readable digital storage, e.g. a hard drive, an optical drive, or solid state storage. Storage 1415 is configured (e.g. by way of an appropriate data structure or file system) to store video frames, artificial frames, a video stream including both video frames and artificial frames, audio frame, an audio stream, and/or the like. Storage 1455 is optionally distributed among a plurality of devices. In some embodiments, Storage 1455 is configured to store the software components of Video Source 1430 discussed elsewhere herein. These components may be stored in a format ready to be provisioned when needed.

Video Server System 1420 optionally further comprises Client Qualifier 1460. Client Qualifier 1460 is configured for remotely determining the capabilities of a client, such as Clients 1410A or 1410B. These capabilities can include both the capabilities of Client 1410A itself as well as the capabilities of one or more communication channels between Client 1410A and Video Server System 1420. For example, Client Qualifier 1460 may be configured to test a communication channel through Network 1415.

Client Qualifier 1460 can determine (e.g., discover) the capabilities of Client 1410A manually or automatically. Manual determination includes communicating with a user of Client 1410A and asking the user to provide capabilities. For example, in some embodiments, Client Qualifier 1460 is configured to display images, text, and/or the like within a browser of Client 1410A. In one embodiment, Client 1410A is an HMD that includes a browser. In another embodiment, client 1410A is a game console having a browser, which may be displayed on the HMD. The displayed objects request that the user enter information such as operating system, processor, video decoder type, type of network connection, display resolution, etc. of Client 1410A. The information entered by the user is communicated back to Client Qualifier 1460.

Automatic determination may occur, for example, by execution of an agent on Client 1410A and/or by sending test video to Client 1410A. The agent may comprise computing instructions, such as java script, embedded in a web page or installed as an add-on. The agent is optionally provided by Client Qualifier 1460. In various embodiments, the agent can find out processing power of Client 1410A, decoding and display capabilities of Client 1410A, lag time reliability and bandwidth of communication channels between Client 1410A and Video Server System 1420, a display type of Client 1410A, firewalls present on Client 1410A, hardware of Client 1410A, software executing on Client 1410A, registry entries within Client 1410A, and/or the like.

Client Qualifier 1460 includes hardware, firmware, and/or software stored on a computer readable medium. Client Qualifier 1460 is optionally disposed on a computing device separate from one or more other elements of Video Server System 1420. For example, in some embodiments, Client Qualifier 1460 is configured to determine the characteristics of communication channels between Clients 1410 and more than one instance of Video Server System 1420. In these embodiments the information discovered by Client Qualifier can be used to determine which instance of Video Server System 1420 is best suited for delivery of streaming video to one of Clients 1410.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the present disclosure.

What is claimed is:

1. A robot, comprising:
a controller that communicates with a computing device, wherein the computing device executes a video game and renders a primary video feed of the video game to a display device, the primary video feed providing a first view into a virtual space that is defined by the executing video game;
a camera that captures images of a local environment in which the robot is disposed;
a projector;
wherein the controller processes the images of the local environment to identify a projection surface in the local environment;
wherein the computing device generates a secondary video feed of the video game and transmits the secondary video feed of the video game to the robot, the secondary video feed providing a second view into the virtual space;

wherein the controller of the robot activates the projector to project the secondary video feed onto the projection surface in the local environment.

2. The robot of claim 1,
wherein the first view into the virtual space is a forward view defined from a perspective of a virtual object of the video game;
wherein the second view into the virtual space is a side view defined from the perspective of the virtual object.

3. The robot of claim 1, wherein the display device is a head-mounted display, the primary video feed providing the first view into the virtual space based on tracked movement of the head-mounted display.

4. The robot of claim 3, wherein the secondary video feed providing the second view into the virtual space based on the tracked movement of the head-mounted display.

5. The robot of claim 3, wherein the controller processes the images of the local environment to determine a gaze direction of a spectator in the local environment, the secondary video feed providing the second view into the virtual space based on the gaze direction of the spectator.

6. The robot of claim 1, further comprising:
at least one actuator that controls a direction of the projector, to enable the projector to project the secondary video feed onto the projection surface.

7. The robot of claim 1, further comprising:
at least one actuator that controls movement of the robot to different locations within the local environment, to enable the camera to capture the images of the local environment or to enable the projector to project the secondary video feed onto the projection surface.

8. A method, comprising:
using a robot to scan a local environment to identify a surface for projection of video thereon;
wherein the robot is configured to communicate with a computing device that executes an interactive application, the computing device configured to render on a display device a primary video feed of the interactive application;
receiving, by the robot from the computing device, a secondary video feed of the interactive application;
using the robot to project the secondary video feed onto the identified surface.

9. The method of claim 8, wherein the display device is a head-mounted display, the primary video feed providing a first view into a virtual space based on tracked movement of the head-mounted display.

10. The method of claim 9, wherein the secondary video feed providing a second view into the virtual space based on the tracked movement of the head-mounted display.

11. The method of claim 9, further comprising:
using the robot to determine a gaze direction of a spectator in the local environment, the secondary video feed providing a second view into the virtual space based on the gaze direction of the spectator.

12. The method of claim 8, wherein using the robot to project the secondary video feed includes activating at least one actuator to control a direction of the projector.

13. The method of claim 8, wherein using the robot to scan the local environment includes activating at least one actuator to control movement of the robot to different locations within the local environment.

14. A non-transitory computer readable medium having program instructions embodied thereon, that when executed by a processor, cause said processor to perform a method including the following operations:
using a robot to scan a local environment to identify a surface for projection of video thereon;
wherein the robot is configured to communicate with a computing device that executes an interactive application, the computing device configured to render on a display device a primary video feed of the interactive application;
receiving, by the robot from the computing device, a secondary video feed of the interactive application;
using the robot to project the secondary video feed onto the identified surface.

15. The non-transitory computer readable medium of claim 14, wherein the display device is a head-mounted display, the primary video feed providing a first view into a virtual space based on tracked movement of the head-mounted display.

16. The non-transitory computer readable medium of claim 15, wherein the secondary video feed providing a second view into the virtual space based on the tracked movement of the head-mounted display.

17. The non-transitory computer readable medium of claim 15, wherein the operations further include:
using the robot to determine a gaze direction of a spectator in the local environment, the secondary video feed providing a second view into the virtual space based on the gaze direction of the spectator.

18. The non-transitory computer readable medium of claim 14, wherein using the robot to project the secondary video feed includes activating at least one actuator to control a direction of the projector.

19. The non-transitory computer readable medium of claim 14, wherein using the robot to scan the local environment includes activating at least one actuator to control movement of the robot to different locations within the local environment.

* * * * *